(12) United States Patent
Zhao et al.

(10) Patent No.: US 10,614,772 B2
(45) Date of Patent: Apr. 7, 2020

(54) DISPLAY METHOD AND TERMINAL DEVICE

(71) Applicant: HUAWEI TECHNOLOGIES CO., LTD., Shenzhen, Guangdong (CN)

(72) Inventors: Jing Zhao, Beijing (CN); Bo Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/083,027

(22) PCT Filed: Mar. 8, 2016

(86) PCT No.: PCT/CN2016/075846
§ 371 (c)(1),
(2) Date: Sep. 7, 2018

(87) PCT Pub. No.: WO2017/152355
PCT Pub. Date: Sep. 14, 2017

(65) Prior Publication Data
US 2019/0096358 A1 Mar. 28, 2019

(51) Int. Cl.
*G09G 5/00* (2006.01)
*G06F 3/147* (2006.01)
(Continued)

(52) U.S. Cl.
CPC ............... *G09G 5/003* (2013.01); *G06F 3/14* (2013.01); *G06F 3/147* (2013.01); *G06T 1/20* (2013.01);
(Continued)

(58) Field of Classification Search
CPC .............................. G06T 1/20; G06T 2210/52
See application file for complete search history.

(56) References Cited

U.S. PATENT DOCUMENTS

2003/0164832 A1* 9/2003 Alcorn ...................... G06T 1/20
345/505
2003/0164833 A1* 9/2003 Walls ........................ G06T 1/20
345/506
(Continued)

FOREIGN PATENT DOCUMENTS

CN 1938671 A 3/2007
CN 101523909 A 9/2009
(Continued)

OTHER PUBLICATIONS

Zhou Lu et al.,"Research on parallel processing of computational fluid imaging",Acta Aerodynamica Sinica, vol. 20,Mar. 2002,total 6 pages with 7 pages English translation.
(Continued)

*Primary Examiner* — Jeffery A Brier
(74) *Attorney, Agent, or Firm* — Fish & Richardson P.C.

(57) ABSTRACT

A display method and a terminal device are provided, so as to resolve a prior-art problem that CPU power consumption of the terminal device is relatively high because a display system of the terminal device processes three procedures in parallel in a Vsync period. The method is: determining, by the display system of the terminal device, a start moment of a first procedure in an $(M+1)^{th}$ Vsync period according to first processing duration of the first procedure in an $M^{th}$ Vsync period, so that the display system starts to execute a device display procedure before starting to execute the first procedure, the display system delays executing the first procedure in the $(M+1)^{th}$ Vsync period, so that a time required for processing three procedures in parallel in the $(M+1)^{th}$ Vsync period by the display system is reduced, and CPU power consumption of the terminal device is reduced.

20 Claims, 12 Drawing Sheets

(51) Int. Cl.
*G09G 5/395* (2006.01)
*G09G 5/36* (2006.01)
*G09G 5/397* (2006.01)
*G09G 5/393* (2006.01)
*G09G 5/02* (2006.01)
*G06F 3/14* (2006.01)
*G09G 5/14* (2006.01)
*G09G 5/377* (2006.01)
*G06T 1/20* (2006.01)

(52) U.S. Cl.
CPC ............. *G09G 5/024* (2013.01); *G09G 5/026* (2013.01); *G09G 5/14* (2013.01); *G09G 5/363* (2013.01); *G09G 5/377* (2013.01); *G09G 5/393* (2013.01); *G09G 5/395* (2013.01); *G09G 5/397* (2013.01); *G06T 2210/52* (2013.01); *G09G 2310/08* (2013.01); *G09G 2320/0252* (2013.01); *G09G 2320/0257* (2013.01); *G09G 2330/021* (2013.01); *G09G 2330/022* (2013.01); *G09G 2330/025* (2013.01); *G09G 2340/14* (2013.01); *G09G 2360/08* (2013.01); *G09G 2360/127* (2013.01); *G09G 2360/18* (2013.01)

(56) References Cited

U.S. PATENT DOCUMENTS

| | | | |
|---|---|---|---|
| 2003/0189578 A1* | 10/2003 | Alcorn | G06F 3/14 345/629 |
| 2005/0184995 A1* | 8/2005 | Lefebvre | G06F 3/14 345/506 |
| 2005/0223249 A1 | 10/2005 | Samson | |
| 2014/0187331 A1 | 7/2014 | Kim et al. | |
| 2014/0270722 A1 | 9/2014 | Wang et al. | |
| 2015/0301585 A1 | 10/2015 | Noro et al. | |
| 2016/0150130 A1 | 5/2016 | Noro | |
| 2016/0247484 A1 | 8/2016 | Chen et al. | |

FOREIGN PATENT DOCUMENTS

| | | |
|---|---|---|
| CN | 103593155 A | 2/2014 |
| CN | 104050040 A | 9/2014 |
| EP | 2056605 A1 | 5/2009 |
| EP | 3056983 A1 | 8/2016 |
| JP | 2008067354 A | 3/2008 |
| JP | 2012002952 A | 1/2012 |
| JP | 2015206931 A | 11/2015 |
| JP | 2016099792 A | 5/2016 |
| WO | 2015067143 A1 | 5/2015 |

OTHER PUBLICATIONS

Chen An-tai et al.,"Synchronous control algorithm of parallel rendering for multidisplay",Computer Engineering and Design, vol. 32, No. 10,dated 2011, total 4 pages with 6 pages English translation.

Extended European Search Report issued in European Application No. 16893007.1 dated Nov. 29, 2018, 11 pages.

International Search Report and Written Opinion issued in International Application No. PCT/CN2016/075846 dated Nov. 29, 2016, 22 pages.

Office Action issued in Japanese Application No. 2018-547469 dated Sep. 9, 2019, 5 pages (with English translation).

EPO Communication pursuant to Article 94(3) EPC issued in European Application No. 16893007.1 dated Feb. 3, 2020, 9 pages.

* cited by examiner

501

A display system obtains first processing duration in which the display system executes a first procedure in an $M^{th}$ Vsync period, where the first procedure is an application drawing procedure or a surfaceflinger composition procedure, and M is a positive integer greater than or equal to 1

502

The display system determines a start moment of the first procedure in an $(M+1)^{th}$ Vsync period according to the first processing duration, where the start moment of the first procedure is after a start moment of a device display procedure in the $(M+1)^{th}$ Vsync period, and a sum of the first processing duration and shift duration between the start moment of the first procedure and a start moment of the $(M+1)^{th}$ Vsync period is less than or equal to duration of the $(M+1)^{th}$ Vsync period

503

In the $(M+1)^{th}$ Vsync period, the display system starts to execute the display procedure at the start moment of the device display procedure, and starts to execute the first procedure at the start moment of the first procedure

FIG. 5

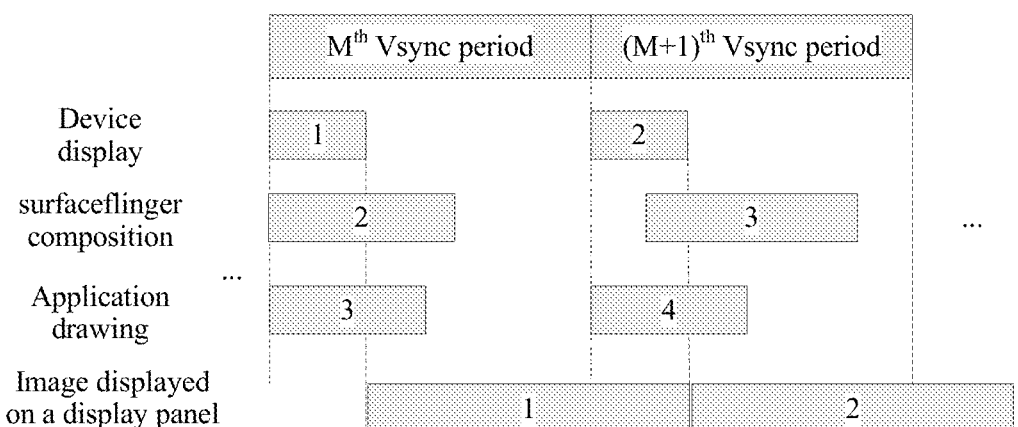

FIG. 6A

DISPLAY METHOD AND TERMINAL DEVICE

CROSS-REFERENCE TO RELATED APPLICATIONS

This application is a National Stage of International Application No. PCT/CN2016/075846, filed on Mar. 8, 2016, which is hereby incorporated by reference in its entirety.

TECHNICAL FIELD

This application relates to the field of display system technologies, and in particular, to a display method and a terminal device.

BACKGROUND

Currently, multiple terminal devices such as a computer, a mobile phone, a tablet computer, a point of sale (Point of Sales, POS), and an in-vehicle computer each include a built-in display system, used to present a user interface (User Interface, UI) and implement human-machine interaction. A display panel included in the display system may be configured in a form of a liquid crystal display (Liquid Crystal Display, LCD), an organic light-emitting diode (Organic Light-Emitting Diode, OLED), or the like.

To ensure smooth display of the terminal device and avoid a frame loss, frameskip, or the like, the display system usually uses a vertical synchronization (Vertical Synchronization, Vsync) technology. A basic principle of the Vsync technology is that the display system generates a control signal at an interval of specified duration, so as to trigger a Vsync period. The specified duration is a value of the Vsync period, for example, 16 milliseconds (ms). When one Vsync period is triggered, the display system starts to process the following three procedures in parallel: an application drawing procedure, a surface (surfaceflinger) composition procedure, and a device display procedure. Original data that needs to be composited in the surfaceflinger composition procedure is a drawing result obtained in the application drawing procedure in a previous Vsync period, and data that needs to be displayed in the device display procedure is a composition result obtained in the surfaceflinger composition procedure in the previous Vsync period.

However, when the conventional Vsync technology is applied to the display system of the terminal device and each Vsync period is triggered, the display system needs to process the application drawing procedure, the surfaceflinger composition procedure, and the device display procedure in parallel. Consequently, transient power consumption of a central processing unit (Central Processing Unit, CPU) of the terminal device is relatively high, a CPU frequency is excessively high, and CPU working performance is reduced.

SUMMARY

Embodiments of this application provide a display method and a terminal device, so as to resolve a prior-art problem that CPU power consumption of the terminal device is relatively high because a display system of the terminal device processes three procedures in parallel in a Vsync period.

According to a first aspect, an embodiment of this application provides a display method, where the method is applicable to a display system of a terminal device, the display system executes a device display procedure, an application drawing procedure, and a surface surfaceflinger composition procedure in each Vsync period, and the method includes the following steps:

obtaining, by the display system, first processing duration in which the display system executes a first procedure in an $M^{th}$ Vsync period, where the first procedure is the application drawing procedure or the surfaceflinger composition procedure, and M is a positive integer greater than or equal to 1;

determining, by the display system, a start moment of the first procedure in an $(M+1)^{th}$ Vsync period according to the first processing duration, where the start moment of the first procedure in the $(M+1)^{th}$ Vsync period is after a start moment of the device display procedure, and a sum of the first processing duration and shift duration between the start moment of the first procedure and a start moment of the $(M+1)^{th}$ Vsync period is less than or equal to duration of the $(M+1)^{th}$ Vsync period; and in the $(M+1)^{th}$ Vsync period, starting, by the display system, to execute the display procedure at the start moment of the device display procedure, and starting, by the display system, to execute the first procedure at the start moment of the first procedure.

By using the foregoing method, in the $(M+1)^{th}$ Vsync period, the display system delays executing either the application drawing procedure or the surfaceflinger composition procedure, so that a time required for processing the three procedures in parallel in the $(M+1)^{th}$ Vsync period by the display system of the terminal device is reduced, and CPU power consumption of the terminal device is reduced.

In a possible design, the start moment of the device display procedure in the $(M+1)^{th}$ Vsync period is the start moment of the $(M+1)^{th}$ Vsync period.

In a possible design, the determining, by the display system, a start moment of the first procedure in the $(M+1)^{th}$ Vsync period according to the first processing duration includes:

obtaining, by the display system, second processing duration in which the display system executes the device display procedure in the $M^{th}$ Vsync period; and determining, by the display system, the start moment of the first procedure in the $(M+1)^{th}$ Vsync period according to the first processing duration and the second processing duration, where the start moment of the first procedure is a first moment or is after the first moment, the first moment is a moment later than the start moment of the device display procedure by the second processing duration, and the sum of the first processing duration and the shift duration between the start moment of the first procedure and the start moment of the $(M+1)^{th}$ Vsync period is less than or equal to the duration of the $(M+1)^{th}$ Vsync period.

By using the foregoing method, the display system sets that the start moment of the first procedure in the $(M+1)^{th}$ Vsync period is the first moment or is after the first moment, that is, the display system starts to execute the first procedure when or after completing execution of the device display procedure in the $(M+1)^{th}$ Vsync period. In this way, it can be ensured that the display system executes the device display procedure and the first procedure in serial, and that the display system does not process the three procedures in parallel in one Vsync period, so that the CPU power consumption of the terminal device is further reduced.

In a possible design, the display system obtains third processing duration in which the display system executes a second procedure in the $M^{th}$ Vsync period, where the second procedure is the other one of the application drawing procedure and the surfaceflinger composition procedure different from the first procedure.

The display system determines a start moment of the second procedure in the $(M+1)^{th}$ Vsync period according to the third processing duration, where the start moment of the second procedure in the $(M+1)^{th}$ Vsync period is after the start moment of the device display procedure, and a sum of the third processing duration and shift duration between the start moment of the second procedure and the start moment of the $(M+1)^{th}$ Vsync period is less than or equal to the duration of the $(M+1)^{th}$ Vsync period.

The display system starts to execute the second procedure at the start moment of the second procedure in the $(M+1)^{th}$ Vsync period.

By using the foregoing method, the display system also shifts the start moment of the second procedure in the $(M+1)^{th}$ Vsync period, so that execution of the second procedure is also delayed, time required for processing the three procedures in parallel in the $(M+1)^{th}$ Vsync period by the display system can also be reduced, and the CPU power consumption of the terminal device can also be reduced.

In a possible design, the start moment of the first procedure in the $(M+1)^{th}$ Vsync period and the start moment of the second procedure in the $(M+1)^{th}$ Vsync period are different, where the start moment of the first procedure and the start moment of the second procedure are determined by the display system. In this way, not only the time required for processing the three procedures in parallel in the $(M+1)^{th}$ Vsync period by the display system can be reduced, but also a time required for processing the first procedure and the second procedure in parallel in the $(M+1)^{th}$ Vsync period by the display system can be reduced, so that the CPU power consumption of the terminal device is further reduced.

In a possible design, the determining, by the display system, a start moment of the second procedure in the $(M+1)^{th}$ Vsync period according to the third processing duration includes:

obtaining, by the display system, the second processing duration in which the display system executes the device display procedure in the $M^{th}$ Vsync period; and determining, by the display system, the start moment of the second procedure in the $(M+1)^{th}$ Vsync period according to the second processing duration and the third processing duration, where the start moment of the second procedure is a second moment or is after the second moment, the second moment is a moment later than the start moment of the device display procedure by the second processing duration, and the sum of the third processing duration and the shift duration between the start moment of the second procedure and the start moment of the $(M+1)^{th}$ Vsync period is less than or equal to the duration of the $(M+1)^{th}$ Vsync period.

By using the foregoing method, the display system sets that the start moment of the second procedure in the $(M+1)^{th}$ Vsync period is the second moment or is after the second moment, that is, the display system starts to execute the second procedure when or after completing execution of the device display procedure in the $(M+1)^{th}$ Vsync period. In this way, it can be ensured that the display system executes the device display procedure and the second procedure in serial, and that the display system does not process the three procedures in parallel in one Vsync period, so that the CPU power consumption of the terminal device is further reduced.

In a possible design, when the display system determines that a sum of the first processing duration, the second processing duration, and the third processing duration is less than or equal to the duration of the $(M+1)^{th}$ Vsync period, duration between the start moment of the first procedure and the start moment of the second procedure is greater than or equal to the first processing duration or the third processing duration.

By using the foregoing method, when determining that the sum of the first processing duration, the second processing duration, and the third processing duration is less than or equal to the duration of the $(M+1)^{th}$ Vsync period, the display system sets that the duration between the start moment of the first procedure in the $(M+1)^{th}$ Vsync period and the start moment of the second procedure in the $(M+1)^{th}$ Vsync period is greater than or equal to the first processing duration or the third processing duration. In this way, the display system executes the three procedures in serial in the $(M+1)^{th}$ Vsync period, so that the CPU power consumption of the terminal device is reduced to a largest extent.

In a possible design, the sum of the first processing duration and the shift duration between the start moment of the first procedure and the start moment of the $(M+1)^{th}$ Vsync period is less than or equal to a difference between the duration of the $(M+1)^{th}$ Vsync period and first preset duration.

In this way, even when processing duration required for executing the first procedure in the $(M+1)^{th}$ Vsync period is greater than the first processing duration, provided that a duration difference obtained by subtracting the first processing duration from the processing duration required when the display system actually executes the first procedure in the $(M+1)^{th}$ Vsync period is less than the first preset duration, the display system may still complete execution of the first procedure before the $(M+1)^{th}$ Vsync period ends, so that a probability of image display hysteresis in the display system is reduced.

In a possible design, the sum of the third processing duration and the shift duration between the start moment of the second procedure and the start moment of the $(M+1)^{th}$ Vsync period is less than or equal to a difference between the duration of the $(M+1)^{th}$ Vsync period and second preset duration.

In this way, even when processing duration required for executing the second procedure in the $(M+1)^{th}$ Vsync period is greater than the third processing duration, provided that a duration difference obtained by subtracting the third processing duration from the processing duration required when the display system actually executes the second procedure in the $(M+1)^{th}$ Vsync period is less than the second preset duration, the display system may still complete execution of the second procedure before the $(M+1)^{th}$ Vsync period ends, so that a probability of image display hysteresis in the display system is reduced.

In a possible design, based on the foregoing method, the display system sets that the start moment of the first procedure in each of Vsync periods from the $(M+1)^{th}$ Vsync period to an $(M+P-1)^{th}$ Vsync period is after the start moment of the device display procedure in a corresponding Vsync period, that is, shifts the start moment of the first procedure. In addition, the display system sets the start moment of the first procedure in an $(M+P)^{th}$ Vsync period as a start moment of the $(M+P)^{th}$ Vsync period, and P is a preset positive integer greater than 1. For example, when P=11, in 10 consecutive Vsync periods starting from the $(M+1)^{th}$ Vsync period, the display system sets that the start moment of the first procedure in each Vsync period is after the start moment of the device display procedure in a corresponding Vsync period, that is, shifts the start moment of the first procedure; and sets the start moment of the first procedure in an $(M+11)^{th}$ Vsync period as a start moment of the $(M+11)^{th}$ Vsync period, that is, subsequently sets, at an interval of 10 Vsync periods, the start moment of the first procedure in a Vsync period following the 10 Vsync periods as a start moment of the corresponding Vsync period.

In this way, the display system shifts the start moment of the first procedure in multiple consecutive Vsync periods, so as to reduce a time required for processing the three procedures in parallel in the multiple Vsync periods by the display system, and reduce the CPU power consumption of the terminal device in an entire display process. In addition, after shifting the start moment of the first procedure in P−1 consecutive Vsync periods, the display system sets the start moment of the first procedure in the $(M+P)^{th}$ Vsync period as the start moment of the $(M+P)^{th}$ Vsync period, so that a probability that a display delay and a frame loss occur in image display of the display system can be reduced.

In a possible design, based on the foregoing method, the display system sets that the start moment of the second procedure in each of Vsync periods from the $(M+1)^{th}$ Vsync period to an $(M+Q-1)^{th}$ Vsync period is after the start moment of the device display procedure in a corresponding Vsync period, that is, shifts the start moment of the second procedure. In addition, the display system sets the start moment of the second procedure in an $(M+Q)^{th}$ Vsync period as a start moment of the $(M+Q)^{th}$ Vsync period, and Q is a preset positive integer greater than 1. For example, when P=21, in 20 consecutive Vsync periods starting from the $(M+1)^{th}$ Vsync period, the display system sets that the start moment of the second procedure in each Vsync period is after the start moment of the device display procedure in a corresponding Vsync period, that is, shifts the start moment of the second procedure; and sets the start moment of the second procedure in an $(M+21)^{th}$ Vsync period as a start moment of the $(M+21)^{th}$ Vsync period, that is, subsequently sets, at an interval of 20 Vsync periods, the start moment of the second procedure in a Vsync period following the 20 Vsync periods as a start moment of the corresponding Vsync period.

In this way, the display system shifts the start moment of the first procedure in multiple consecutive Vsync periods, so as to reduce a time required for processing the three procedures in parallel in the multiple Vsync periods by the display system, and reduce the CPU power consumption of the terminal device in an entire display process. In addition, after shifting the start moment of the second procedure in Q−1 consecutive Vsync periods, the display system sets the start moment of the second procedure in the $(M+Q)^{th}$ Vsync period as the start moment of the $(M+Q)^{th}$ Vsync period, so that a probability that a display delay and a frame loss occur in image display of the display system can be reduced.

According to another aspect, an embodiment of the present invention provides a terminal device, where the terminal device has a function of implementing operations of the terminal device in the foregoing method embodiment, and the function may be implemented by using hardware, or may be implemented by executing corresponding software by hardware. The hardware or software includes one or more modules corresponding to the foregoing function.

In a possible design, a structure of the terminal device includes an obtaining unit, a processing unit, and an operating unit. These units may execute a corresponding function in the foregoing method example. For details, refer to detailed description in the method example. Details are not described repeatedly.

In another possible design, a structure of the terminal device includes a processor, a bus, a memory, and a display panel. The processor, the memory, and the display panel are connected by using the bus. The processor invokes an instruction in the memory, to execute a function in the foregoing method design. The display panel is configured to: after the processor executes the device display procedure in each Vsync period, display an image generated after the processor executes the device display procedure.

In the embodiments of the present invention, after obtaining the first processing duration of executing the first procedure in the $M^{th}$ Vsync period, the display system of the terminal device determines the start moment of the first procedure in the $(M+1)^{th}$ Vsync period according to the first processing duration. The first procedure is the application drawing procedure or the surfaceflinger composition procedure. The start moment of the first procedure in the $(M+1)^{th}$ Vsync period is after the start moment of the device display procedure, and the sum of the first processing duration and the shift duration between the start moment of the first procedure and the start moment of the $(M+1)^{th}$ Vsync period is less than or equal to the duration of the $(M+1)^{th}$ Vsync period. In the $(M+1)^{th}$ Vsync period, the display system starts to execute the device display procedure at the start moment of the device display procedure, and starts to execute the first procedure at the start moment of the first procedure. In this way, in the $(M+1)^{th}$ Vsync period, the display system delays executing either the application drawing procedure or the surfaceflinger composition procedure, so that a time required for processing the three procedures in parallel in the $(M+1)^{th}$ Vsync period by the display system of the terminal device is reduced, and the CPU power consumption of the terminal device is reduced.

BRIEF DESCRIPTION OF DRAWINGS

FIG. 5 is a flowchart of a display method according to an embodiment of the present invention;

FIG. 6A is a flowchart of a display example according to an embodiment of the present invention;

DESCRIPTION OF EMBODIMENTS

To make the objectives, technical solutions, and advantages of the present invention clearer, the following further describes the present invention in detail with reference to the accompanying drawings. Apparently, the described embodiments are only some rather than all of the embodiments of the present invention. All other embodiments obtained by persons of ordinary skill in the art based on the embodiments of the present invention without creative efforts shall fall within the protection scope of the present invention.

The embodiments of the present invention provide a display method and a terminal device, so as to resolve a prior-art problem that CPU power consumption of the terminal device is relatively high because a display system of the terminal device processes three procedures in parallel in a Vsync period. The method and the apparatus are based on a same invention concept. Because problem-resolving principles of the method and the apparatus are similar, for implementation of the apparatus and the method, refer to the apparatus and the method mutually. No repeated description is provided.

The following describes some terms in this application, to facilitate understanding of persons skilled in the art.

The "terminal device" used in the present invention is a device that includes a built-in display system and can implement a human-machine interaction function. The terminal device may be a computer, a mobile phone, a tablet computer, a point of sale (Point of Sales, POS), an in-vehicle computer, or the like. In this application, only the mobile phone is used as an example.

The display system is built in the terminal device, and is used to present an interface UI and implement human-machine interaction. The display system may process an image, and display the image on a display panel in the display system. The display panel may be configured in a form of an LCD, an OLED, or the like.

A surface includes many pixels, and is a basic unit to form an image. One frame of image may be one surface, or may be formed by superimposing multiple surfaces in an up-down direction. The surface is like film including an element such as a text or a graphic, and a final effect of an image is obtained by superimposing surfaces one by one according to a sequence.

A frame rate is generally a quantity of frames of images displayed in one second. In the embodiments of the present invention, frame rate=1 second/Vsync period duration.

In addition, it should be understood that in the description of this application, the words such as "first" and "second" are only used for distinction description, and shall not be understood as an indication or implication of relative importance, or an indication or implication of a sequence.

Figure 1:
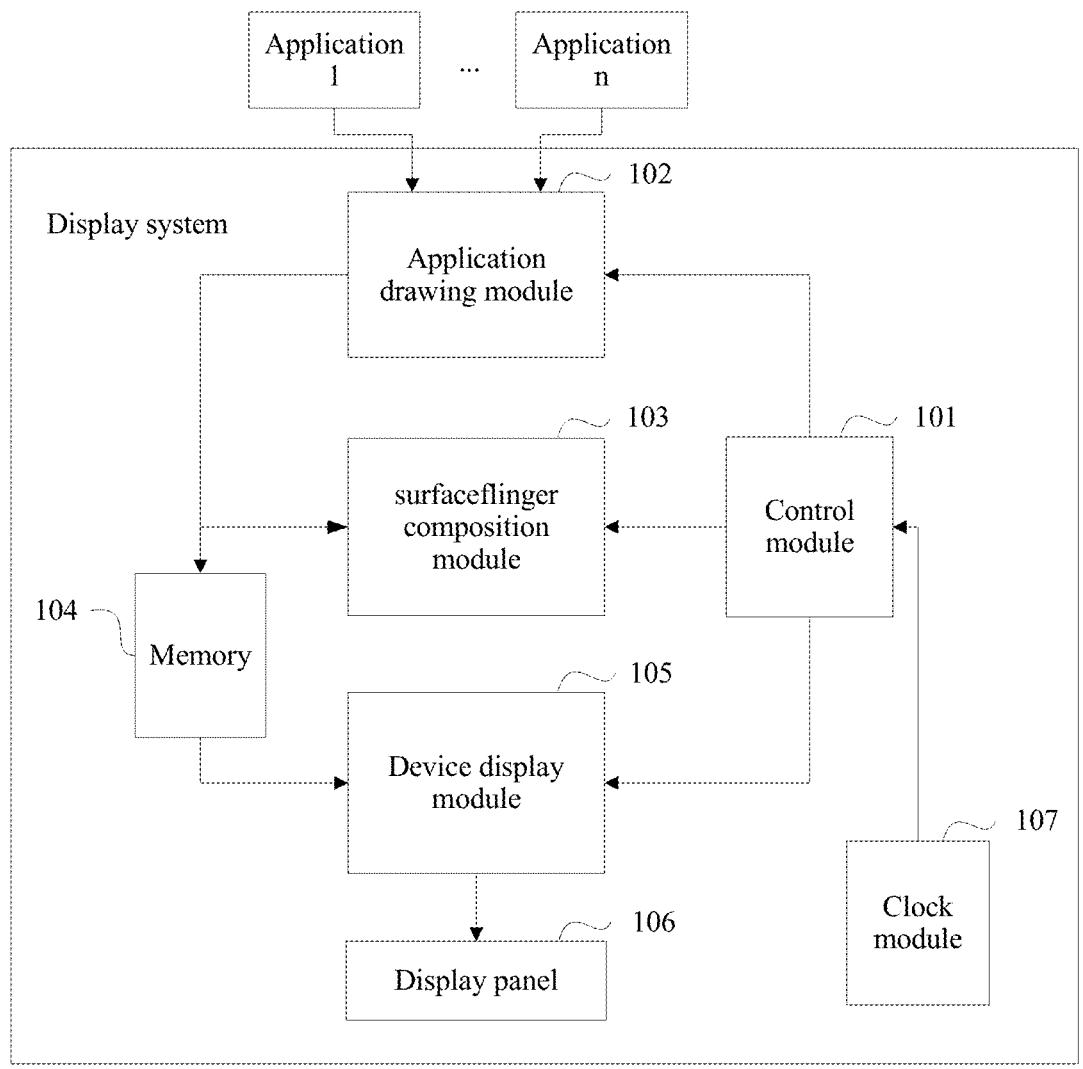
FIG. 1 is a schematic diagram of an architecture of a display system according to an embodiment of the present invention.

The display method provided in the embodiments of the present invention is applicable to an architecture of a display system shown in FIG. 1. The architecture of the display system includes a control module 101, an application drawing module 102, a surfaceflinger composition module 103, a memory 104, a device display module 105, a display panel 106, and a clock module 107.

The control module 101 sends a control signal to the application drawing module 102, the surfaceflinger composition module 103, and the device display module 105 in the display system, to control the foregoing modules, so that the application drawing module 102, the surfaceflinger composition module 103, and the device display module 105 process image data.

After receiving the control signal from the control module 101, the application drawing module 102 obtains to-be-displayed surface data of multiple applications (for example, an application 1 to an application n in the figure) that needs to be displayed by the terminal device; performs drawing processing according to the obtained multiple pieces of to-be-displayed surface data, to generate multiple surfaces; and sends the multiple generated surfaces to the memory 104.

After receiving the control signal from the control module 101, the surfaceflinger composition module 103 obtains the multiple surfaces from the memory 104; performs surface composition, to generate a final frame of image; and sends the generated image to the memory 104. The surfaceflinger composition module 103 further includes a hardware composer (Hardware Compose, HWC) process during surface composition.

The memory 104 is generally a buffer, and stores the multiple surfaces generated by the application drawing module 102 and the image generated by the surfaceflinger composition module 103.

After receiving the control signal from the control module 101, the device display module 105 obtains the image in the memory 104, and pushes the image to the display panel 106.

The display panel 106 is configured to directly display the image sent by the device display module 105.

The clock module 107 is configured to: collect statistics about clocks, and send a clock signal to the control module 101 at an interval of specified duration (a Vsync period), so as to instruct the control module 101 to: trigger a Vsync period, generate a control signal, and send the control signal to the application drawing module 102, the surfaceflinger composition module 103, and the device display module 105 simultaneously, to instruct each module to execute a corresponding procedure.

Figure 2:
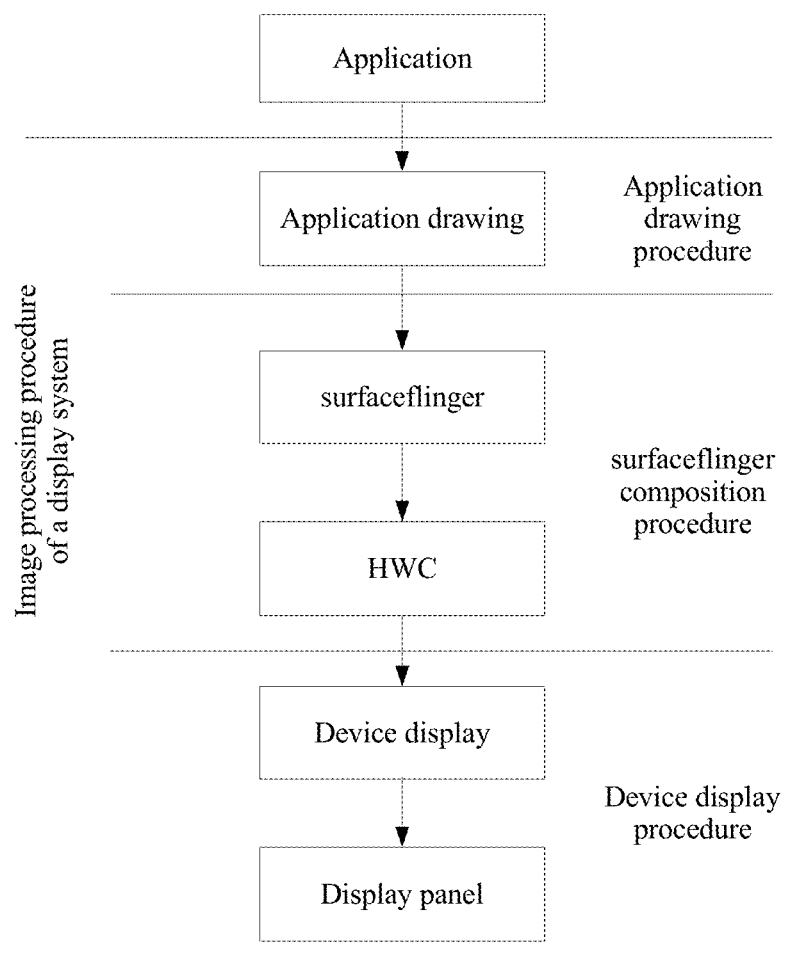
FIG. 2 is a schematic flowchart of displaying one frame of image according to an embodiment of the present invention.

Therefore, conventionally, as shown in FIG. 2, an image display procedure implemented by using the display system shown in FIG. 1 includes the following procedures:

In an application drawing procedure, multiple pieces of to-be-displayed surface data that are of multiple applications and need to be displayed are obtained, and drawing processing is performed on the multiple pieces of to-be-displayed surface data, to generate multiple surfaces;

in a surfaceflinger composition procedure, surfaceflinger processing and HWC processing are performed on the multiple surfaces generated in the application drawing procedure, to generate one frame of to-be-displayed image; and in a device display procedure, device display processing is performed on the to-be-displayed image generated in the surfaceflinger composition procedure, and the to-be-displayed image is pushed to a display panel.

Figure 3:
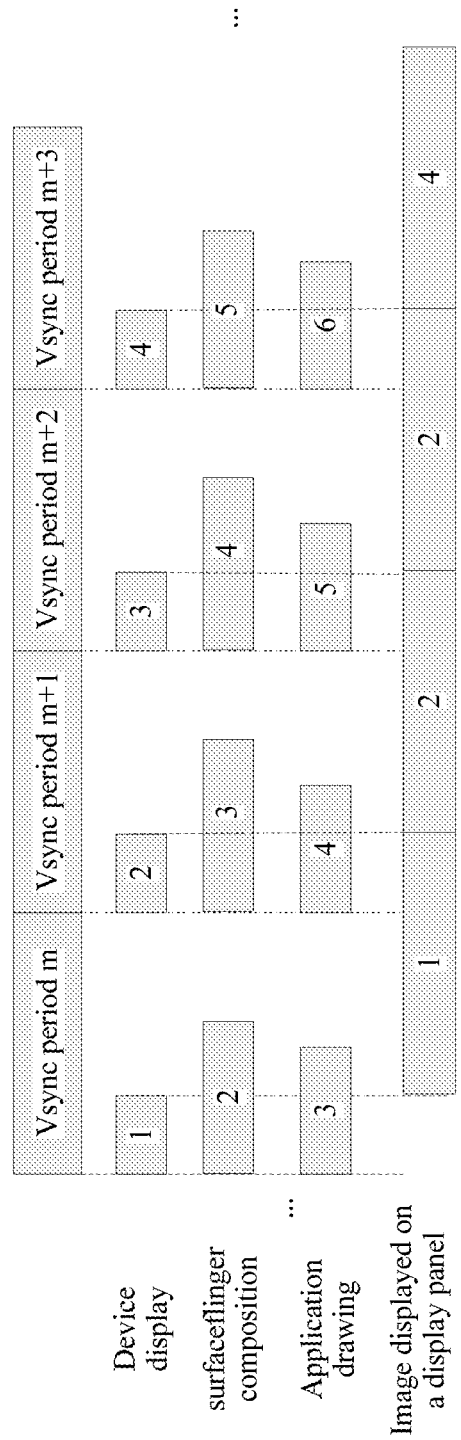
FIG. 3 is a schematic flowchart of image display in the prior art.

It can be learned according to descriptions of the display system and the image display procedure that, the display system may execute the application drawing procedure, the surfaceflinger composition procedure, or the device display procedure once in one Vsync period. However, one frame of image needs to be displayed by processing the foregoing three procedures. Therefore, three Vsync periods are required for displaying one frame of image. To avoid a case in which image display is excessively slow, the display system processes the following three procedures in parallel in each Vsync period: the application drawing procedure, the surfaceflinger composition procedure, and the device display procedure. Original data that needs to be composited in the surfaceflinger composition procedure is a drawing result obtained in the application drawing procedure in a previous Vsync period, and data that needs to be displayed in the device display procedure is a composition result obtained in the surfaceflinger composition procedure in the previous Vsync period. In addition, conventionally, as shown in FIG. 3, the foregoing three procedures start to be executed simultaneously when one Vsync period is triggered.

The three procedures are simultaneously started at a start moment of an $m^{th}$ Vsync period. Data of a first frame of image is processed in the device display procedure. When processing is completed, the display panel displays the first frame of image. Data of a second frame of image is processed in the surfaceflinger composition procedure. Data of a third frame of image is processed in the application drawing procedure.

The three procedures are simultaneously started at a start moment of an $(m+1)^{th}$ Vsync period. The data of the second frame of image is processed in the device display procedure. When processing is completed, the display panel displays the second frame of image. The data of the third frame of image is processed in the surfaceflinger procedure. Data of a fourth frame of image is processed in the application drawing procedure.

The three procedures are simultaneously started at a start moment of an $(m+2)^{th}$ Vsync period. The data of the third frame of image is processed in the device display procedure. When processing is completed, the display panel displays the third frame of image. The data of the fourth frame of image is processed in the surfaceflinger procedure. Data of a fifth frame of image is processed in the application drawing procedure.

The three procedures are simultaneously started at a start moment of an $(m+3)^{th}$ Vsync period. The data of the fourth frame of image is processed in the device display procedure. When processing is completed, the display panel displays the fourth frame of image. The data of the fifth frame of image is processed in the surfaceflinger procedure. Data of a sixth frame of image is processed in the application drawing procedure.

In the device display procedure, the display system only needs to read data in a buffer and display the data on the display panel. Therefore, processing duration of the procedure is relatively constant in each Vsync period, and is usually several milliseconds. Therefore, a time period in which the display panel usually displays one frame of image usually starts from the end of the device display procedure in a Vsync period to the end of the device display procedure in a next Vsync period, and total duration is almost the same as Vsync period duration.

The display method in the embodiments of the present invention is applicable to various terminal devices that include a display system and support a Vsync technology. For example, when a screen of a computer, a mobile phone, a POS, or the like displays an image, the display method provided in the embodiments of the present invention may be used.

By using the technical solutions of the present invention, after obtaining first processing duration of executing a first procedure in the $M^{th}$ Vsync period, the display system of the terminal device determines a start moment of the first procedure in a next Vsync period (the $(M+1)^{th}$ Vsync period) according to the first processing duration. The first procedure is the application drawing procedure or the surfaceflinger composition procedure. The start moment of the first procedure in the $(M+1)^{th}$ Vsync period is after a start moment of the device display procedure, and a sum of the first processing duration and shift duration between the start moment of the first procedure and a start moment of the $(M+1)^{th}$ Vsync period is less than or equal to duration of the $(M+1)^{th}$ Vsync period. In the $(M+1)^{th}$ Vsync period, the display system starts to execute the device display procedure at the start moment of the device display procedure, and starts to execute the first procedure at the start moment of the first procedure. In this way, in the $(M+1)^{th}$ Vsync period, the display system delays executing either the application drawing procedure or the surfaceflinger composition procedure, so that a time required for processing the three procedures in parallel in the $(M+1)^{th}$ Vsync period by the display system of the terminal device is reduced, and CPU power consumption of the terminal device is reduced.

The embodiments of the present invention provide the display method and the terminal device. The display method is applicable to the terminal device, and the terminal device used in the embodiments of the present invention may be a device such as a computer, a mobile phone, a tablet computer, a personal digital assistant (Personal Digital Assistant, PDA), a point of sale (Point of Sales, POS), or an in-vehicle computer.

Figure 4:
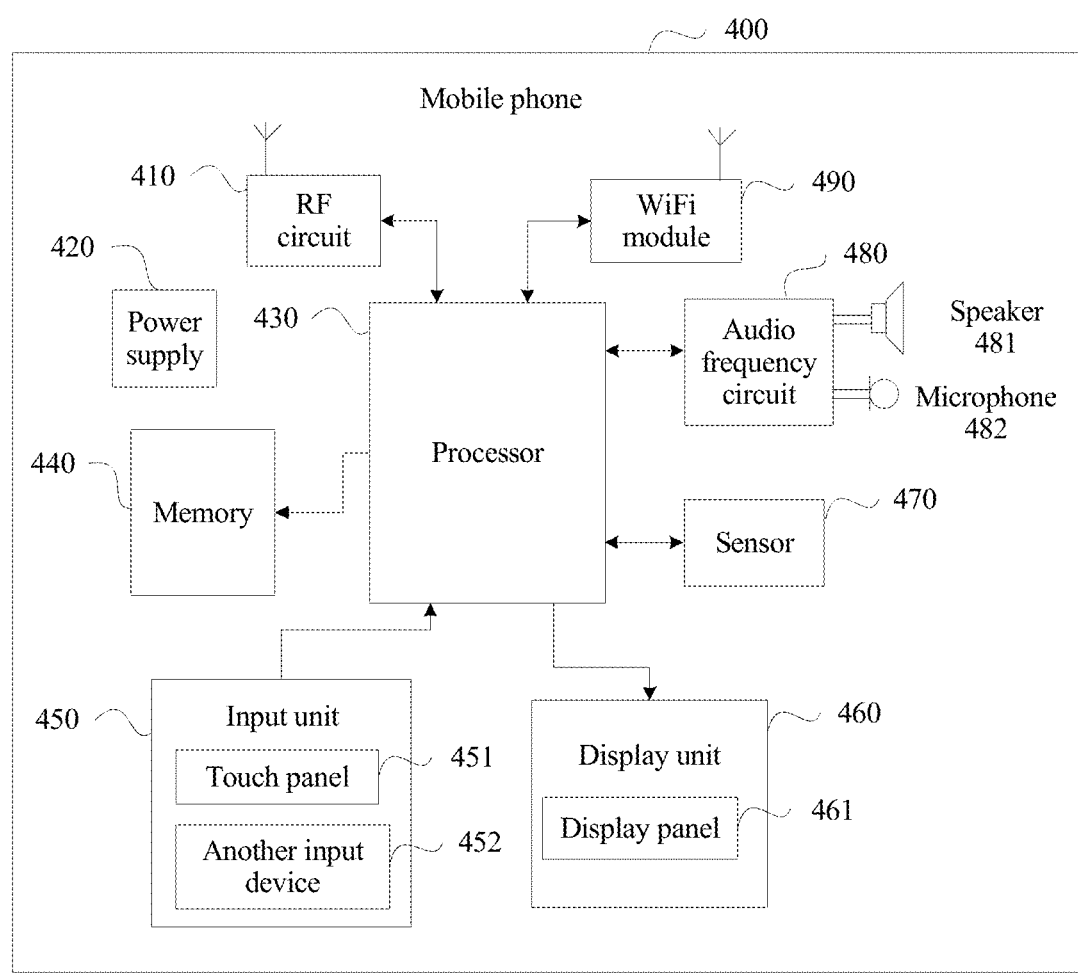
FIG. 4 is a schematic structural diagram of a terminal device according to an embodiment of the present invention.

That the terminal device is a mobile phone is used as an example. FIG. 4 is a block diagram of a partial structure of a mobile phone 400 related to an embodiment of the present invention. Referring to FIG. 4, the mobile phone 400 includes components such as a radio frequency (Radio Frequency, RF) circuit 410, a power supply 420, a processor 430, a memory 440, an input unit 450, a display unit 460, a sensor 470, an audio frequency circuit 480, and a wireless fidelity (wireless fidelity, WiFi) module 490. Persons skilled in the art may understand that the structure of the mobile phone shown in FIG. 4 constitutes no limitation on the mobile phone, and the mobile phone may include components more or fewer than those shown in the figure, or may combine some components, or have different component arrangements.

The following describes each component of the mobile phone 400 in detail with reference to FIG. 4.

The RF circuit 410 may be configured to: receive and send information, or receive and send a signal in a call process. In particular, after receiving downlink information of a base station, the RF circuit 410 sends the downlink information to the processor 430 for processing, and in addition, sends designed uplink data to the base station. Generally, the RF circuit 410 includes but is not limited to an antenna, at least one amplifier, a transceiver, a coupler, a low noise amplifier (Low Noise Amplifier, LNA), and a duplexer. In addition, the RF circuit 410 may further communicate with a network and another device by means of wireless communication. Any communications standard or protocol may be used for the wireless communication, including but not limited to a Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, and a short messaging service (Short Messaging Service, SMS).

The memory 440 may be configured to store a software program and a module. By running the software program and the module that are stored in the memory 440, the processor 430 executes various function applications of the mobile phone 400 and performs data processing. The memory 440 may primarily include a program storage area and a data storage area. The program storage area may store an operating system, and an application program required by at least one function (such as a sound playback function or an image playback function), and the like. The data storage area may store data (such as audio data or a phonebook) created according to use of the mobile phone 400, and the like. In addition, the memory 440 may include a high-speed random access memory, and may further include a nonvolatile memory, such as at least one magnetic disk storage component, a flash memory component, or another volatile solid-state storage component.

The input unit 450 may be configured to: receive entered digit or character information, and generate key signal input related to user setting and function control of the mobile phone 400. Specifically, the input unit 450 may include a touch panel 451 and another input device 452. The touch panel 451 is also referred to as a touchscreen, and may collect a touch operation (such as an operation performed by a user on the touch panel 451 or near the touch panel 451 by using any proper object or accessory such as a finger or a stylus) performed by the user on or near the touch panel, and drive a corresponding connection apparatus according to a preset program. Optionally, the touch panel 451 may include two parts: a touch detection apparatus and a touch controller. The touch detection apparatus detects a touch position of the user, detects a signal brought by the touch operation, and transfers the signal to the touch controller. The touch controller receives touch information from the touch detection apparatus, converts the touch information into touch point coordinates, sends the touch point coordinates to the processor 430, and may receive and execute a command sent by the processor 430. In addition, the touch panel 451 may be implemented by using multiple types such as a resistive type, a capacitive type, an infrared ray type, and a surface acoustic wave type. The input unit 450 may further include the another input device 452 in addition to the touch panel 451. Specifically, the another input device 452 may include but is not limited to one or more of a physical keyboard, a function key (such as a volume control key or an on/off key), a trackball, a mouse, or a joystick.

The display unit 460 may be configured to display information entered by the user or information provided to the user, and various menus of the mobile phone 400. The display unit 460 is a display system of the mobile phone 400, and the display system is used to present an interface UI and implement human-machine interaction. The display unit 460 may include a display panel 461. Optionally, the display panel 461 may be configured in a form of an LCD, an OLED, or the like. Further, the touch panel 451 may cover the display panel 461. When detecting a touch operation on or near the touch panel 451, the touch panel 451 transfers the touch operation to the processor 430 to determine a type of a touch event, and then the processor 430 provides corresponding visual output on the display panel 461 according to the type of the touch event. Although the touch panel 451 and the display panel 451 in FIG. 4 are used as two independent components to implement input and input functions of the mobile phone 400, in some embodiments, the touch panel 451 and the display panel 461 may be integrated to implement the input and output functions of the mobile phone 400.

The mobile phone 400 may further include at least one sensor 470, such as a light sensor, a motion sensor, or another sensor. Specifically, the light sensor may include an ambient light sensor and a proximity sensor. The ambient light sensor may adjust luminance of the display panel 461 according to brightness or dimness of ambient light. The proximity sensor may turn off the display panel 461 and/or backlight when the mobile phone 400 moves to an ear of the user. As a type of motion sensor, an accelerometer sensor may detect an acceleration value in each direction (generally, three axes), detect a value and a direction of gravity when the accelerometer sensor is static, and may be used in an application for recognizing a mobile phone posture (for example, switching between landscape and portrait modes, a related game, and magnetometer posture calibration), a function related to vibration recognition (such as a pedometer or a knock), and the like. For another sensor such as a gyroscope, a barometer, a hygrometer, a thermometer, or an infrared sensor that may also be disposed on the mobile phone 400, details are not described herein.

An audio frequency circuit 480, a speaker 481, and a microphone 482 may provide an audio interface between the user and the mobile phone 400. The audio frequency circuit 480 may convert received audio data into an electrical signal, and transmit the electrical signal to the speaker 481, and the speaker 481 converts the electrical signal into a sound signal for output. In addition, the microphone 482 converts a collected sound signal into an electrical signal, and the audio frequency circuit 480 receives the electrical signal, converts the electrical signal into audio data, and then outputs the audio data to the RF circuit 410, so as to send the audio data to, for example, another mobile phone, or output the audio data to the memory 440 for further processing.

WiFi is a short-range wireless transmission technology. By using the WiFi module 490, the mobile phone 400 may help the user receive and send an email, browse a web page, access streaming media, and the like. The WiFi module provides the user with wireless broadband Internet access. Although FIG. 4 shows the WiFi module 490, it can be understood that the WiFi module 490 is not a mandatory component of the mobile phone 400, and may be totally omitted according to a requirement without changing the essence of the present invention.

The processor 430 is a control center of the mobile phone 400, uses various interfaces and lines to connect all parts of the entire mobile phone, and by running or executing the software program and/or the module stored in the memory 440 and invoking data stored in the memory 440, executes various functions of the mobile phone 400 and processes data, so as to implement multiple services that are based on the mobile phone. Optionally, the processor 430 may include one or more processing units. Preferably, an application processor and a modem processor may be integrated into the processor 430. The application processor primarily processes an operating system, a user interface, an application program, and the like; and the modem processor primarily processes wireless communication. It can be understood that the foregoing modem processor may not be integrated into the processor 430.

The mobile phone 400 further includes the power supply 420 (such as a battery) that supplies power to each component. Preferably, the power supply may be logically connected to the processor 430 by using a power supply management system, so that functions such as charging and discharging management, and power consumption management are implemented by using the power supply management system.

The mobile phone 400 may further include a camera, a Bluetooth module, and the like, although not shown in the figure. Details are not described herein.

An embodiment of the present invention provides a display method. The method is applied to a display system of a terminal device. The display system is used to execute a device display procedure, an application drawing procedure, and a surface surfaceflinger composition procedure in each Vsync period. The terminal device may be a computer, a tablet computer, the mobile phone shown in FIG. 4, or the like. Referring to FIG. 5, a specific procedure of the method includes the following steps.

Step 501: The display system obtains first processing duration in which the display system executes a first procedure in an $M^{th}$ Vsync period, where the first procedure is the application drawing procedure or the surfaceflinger composition procedure, and M is a positive integer greater than or equal to 1.

Conventionally, when the display system of the terminal device uses a Vsync technology, the display system needs to process the application drawing procedure, the surfaceflinger composition procedure, and the device display procedure in parallel at a start moment of each Vsync period. Generally, to avoid image display hysteresis, each procedure in one Vsync period should be completed before or when the Vsync period ends. In the device display procedure of the foregoing three procedures, the display system only needs to read data in a buffer and display the data on a display panel of the terminal device. Therefore, compared with the other two procedures, the procedure has relatively short processing duration that is usually several milliseconds, and the other two procedures consume a longer time.

Step 502: The display system determines a start moment of the first procedure in an $(M+1)^{th}$ Vsync period according to the first processing duration, where the start moment of the first procedure in the $(M+1)^{th}$ Vsync period is after a start moment of the device display procedure, and a sum of the first processing duration and shift duration between the start moment of the first procedure and a start moment of the $(M+1)^{th}$ Vsync period is less than or equal to duration of the $(M+1)^{th}$ Vsync period.

The start moment of the device display procedure in the $(M+1)^{th}$ Vsync period is the start moment of the $(M+1)^{th}$ Vsync period. In addition, in step 502, because the display system sets that the start moment of the first procedure in the $(M+1)^{th}$ Vsync period is after the start moment of the device display procedure, that is, shifts the start moment of the first procedure, execution of the first procedure is delayed.

The display system needs to delay executing the first procedure in the $(M+1)^{th}$ Vsync period. When determining the start moment of the first procedure in the $(M+1)^{th}$ Vsync period, the display system further needs to avoid, as much as possible, image display hysteresis caused because the display system does not complete execution of the first procedure when the $(M+1)^{th}$ Vsync period ends. Therefore, when determining the start moment of the first procedure in the $(M+1)^{th}$ Vsync period, the display system needs to estimate processing duration in which the display system executes the first procedure in the current Vsync period. Generally, two adjacent frames of images are relatively similar, and data processed by the display system in the application drawing procedure in each of two adjacent Vsync periods belongs to data of two adjacent frames of images. Similarly, data processed by the display system in the surfaceflinger composition procedure in each of the two adjacent Vsync periods belongs to data of two adjacent frames of images, and data processed in the device display procedure in each of the two adjacent Vsync periods also belongs to data of two adjacent frames of images. Therefore, processing duration in which the display system executes each of the application drawing procedure, the surfaceflinger composition procedure, and the device display procedure in the $M^{th}$ Vsync period is similar to processing duration in which the display system executes a corresponding procedure in the $(M+1)^{th}$ Vsync period.

Based on the foregoing conclusion, in this embodiment of the present invention, the first processing duration of the first procedure in the $M^{th}$ Vsync period is used as the processing duration that is estimated by the display system and in which the display system executes the first procedure in the $(M+1)^{th}$ Vsync period.

The sum of the first processing duration and the shift duration between the start moment of the first procedure in the $(M+1)^{th}$ Vsync period and the start moment of the $(M+1)^{th}$ Vsync period is less than or equal to the duration of the $(M+1)^{th}$ Vsync period, where the start moment of the first procedure is determined by the display system, so that it is ensured that when the $(M+1)^{th}$ Vsync period ends, the display system can complete execution of the first procedure as predicted, and image display hysteresis is avoided.

Figure 6B:
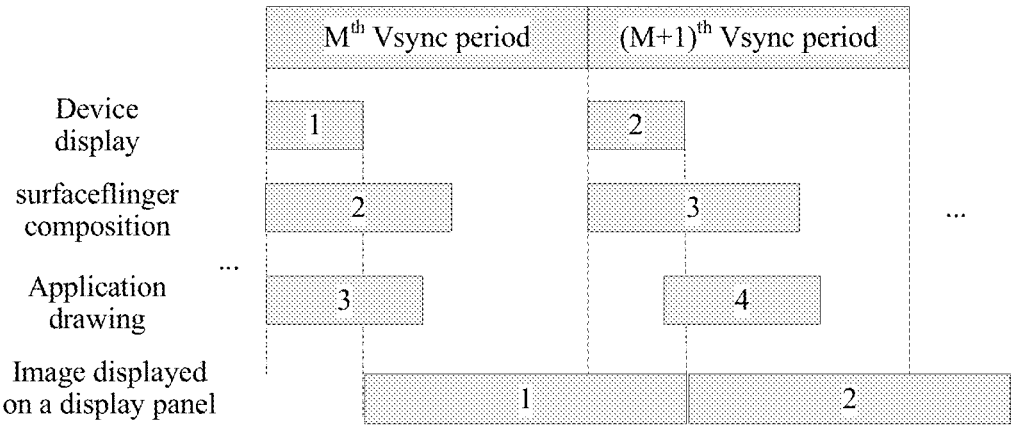
FIG. 6B is a flowchart of a display example according to an embodiment of the present invention.

By using step 502, the display system shifts the start moment of the first procedure in the $(M+1)^{th}$ Vsync period, to delay executing the first procedure, so that a time required for processing the three procedures in parallel in the $(M+1)^{th}$ Vsync period by the display system of the terminal device is reduced, and CPU power consumption of the terminal device is reduced. For example, FIG. 6A is a diagram of a display example when the first procedure is the surfaceflinger composition procedure. As shown in the figure, the display system sets that a start moment of the surfaceflinger composition procedure is after the device display moment in the $(M+1)^{th}$ Vsync period, and the display system delays executing the surfaceflinger composition procedure, so that time required for processing the three procedures in parallel in the $(M+1)^{th}$ Vsync period by the display system is reduced, and the CPU power consumption of the terminal device is reduced. Similarly, as shown in FIG. 6B, when the first procedure is the application drawing procedure, the time required for processing the three procedures in parallel within shorter time in the $(M+1)^{th}$ Vsync period by the display system can also be reduced, and the CPU power consumption of the terminal device can also be reduced.

Optionally, the determining, by the display system, a start moment of the first procedure in the $(M+1)^{th}$ Vsync period according to the first processing duration includes:

obtaining, by the display system, second processing duration in which the display system executes the device display procedure in the $M^{th}$ Vsync period; and determining, by the display system, the start moment of the first procedure in the $(M+1)^{th}$ Vsync period according to the first processing duration and the second processing duration, where the start moment of the first procedure is a first moment or is after the first moment, the first moment is a moment later than the start moment of the device display procedure by the second processing duration, and the sum of the first processing duration and the shift duration between the start moment of the first procedure and the start moment of the $(M+1)^{th}$ Vsync period is less than or equal to the duration of the $(M+1)^{th}$ Vsync period.

To avoid image display hysteresis, before setting that the start moment of the first procedure in the $(M+1)^{th}$ Vsync period is the first moment or is after the first moment, the display system needs to determine a relationship between the duration of the $(M+1)^{th}$ Vsync period and the sum of the first processing duration and the shift duration between the start moment of the first procedure and the start moment of the $(M+1)^{th}$ Vsync period. When determining that the sum of the first processing duration and the shift duration between the start moment of the first procedure and the start moment of the $(M+1)^{th}$ Vsync period is less than or equal to the duration of the $(M+1)^{th}$ Vsync period, the display system may set that the start moment of the first procedure in the $(M+1)^{th}$ Vsync period is the first moment or is after the first moment.

By using the foregoing method, the display system sets that the start moment of the first procedure in the $(M+1)^{th}$ Vsync period is the first moment or is after the first moment, that is, the display system starts to execute the first procedure when or after completing execution of the device display procedure in the $(M+1)^{th}$ Vsync period. In this way, it can be ensured that the display system executes the device display procedure and the first procedure in serial, and that the display system does not process the three procedures in parallel in one Vsync period, so that the CPU power consumption of the terminal device is further reduced.

Figure 7A:
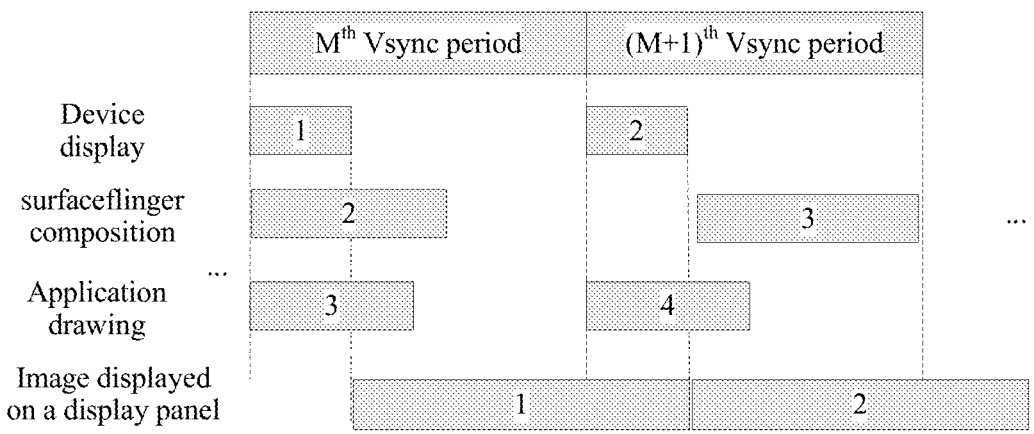
FIG. 7A is a flowchart of a display example according to an embodiment of the present invention.

FIG. 7A is a diagram of a display example when the first procedure is the surfaceflinger composition procedure. A start moment at which the display system executes the surfaceflinger composition procedure in the $(M+1)^{th}$ Vsync period is after a moment at which the display system completes execution of the device display procedure, that is, the display system executes the device display procedure and the surfaceflinger composition procedure in serial, so that it is ensured that the display system does not process the three procedures in parallel in the $(M+1)^{th}$ Vsync period, and the CPU power consumption of the terminal device is reduced.

Figure 7B:
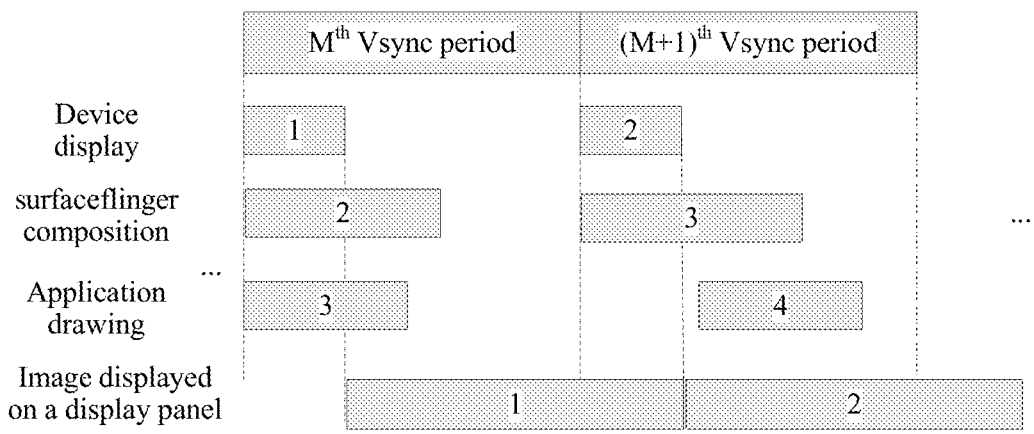
FIG. 7B is a flowchart of a display example according to an embodiment of the present invention.

FIG. 7B is a diagram of a display example when the first procedure is the application drawing procedure. A start moment at which the display system executes the application drawing procedure in the $(M+1)^{th}$ Vsync period is after a moment at which the display system completes execution of the device display procedure, that is, the display system executes the device display procedure and the application drawing procedure in serial, so that it is ensured that the display system does not process the three procedures in parallel in the $(M+1)^{th}$ Vsync period, and the CPU power consumption of the terminal device is reduced.

It can be learned from the foregoing description that, when determining the start moment of the first procedure in the $(M+1)^{th}$ Vsync period, the display system estimates the first processing duration of executing the first procedure in the $M^{th}$ Vsync period as the processing duration in which the display system actually executes the first procedure in the $(M+1)^{th}$ Vsync period. However, because there may be an error between the first processing duration and the processing duration required when the display system actually executes the first procedure in the $(M+1)^{th}$ Vsync period, if the processing duration required when the display system actually executes the first procedure in the $(M+1)^{th}$ Vsync period is greater than the first processing duration, and the sum of the first processing duration and the shift duration between the start moment of the first procedure in the $(M+1)^{th}$ Vsync period and the start moment of the $(M+1)^{th}$ Vsync period is equal to the duration of the $(M+1)^{th}$ Vsync period, the display system cannot complete execution of the first procedure in the $(M+1)^{th}$ Vsync period. Consequently, image display hysteresis occurs in the display system.

Therefore, optionally, to reduce a probability of image display hysteresis caused by the foregoing reason, the sum of the first processing duration and the shift duration between the start moment of the first procedure and the start moment of the $(M+1)^{th}$ Vsync period is less than or equal to a difference between the duration of the $(M+1)^{th}$ Vsync period and first preset duration, where the start moment of the first procedure is determined by the display system. In this way, even when the processing duration required for executing the first procedure in the $(M+1)^{th}$ Vsync period is greater than the first processing duration, provided that a duration difference obtained by subtracting the first processing duration from the processing duration required when the display system actually executes the first procedure in the $(M+1)^{th}$ Vsync period is less than the first preset duration, the display system may still complete execution of the first procedure before the $(M+1)^{th}$ Vsync period ends, so that a probability of image display hysteresis in the display system is reduced.

Step 503: In the $(M+1)^{th}$ Vsync period, the display system starts to execute the display procedure at the start moment of the device display procedure, and the display system starts to execute the first procedure at the start moment of the first procedure.

The start moment of the device display procedure in the $(M+1)^{th}$ Vsync period is the start moment of the $(M+1)^{th}$ Vsync period. Therefore, the display system starts to execute the device display procedure at the start moment of the $(M+1)^{th}$ Vsync period.

Optionally, a start moment of a second procedure in the $(M+1)^{th}$ Vsync period may also be the start moment of the $(M+1)^{th}$ Vsync period. The second procedure is the other one of the application drawing procedure and the surfaceflinger composition procedure different from the first procedure, that is, the display system starts to execute the second procedure and the device display procedure simultaneously at the start moment of the $(M+1)^{th}$ Vsync period. Execution of the application drawing procedure and the surfaceflinger composition procedure by the display system causes relatively high CPU power consumption of the terminal device. However, compared with the foregoing two procedures, power consumption is relatively low when the display system executes the device display procedure. Therefore, the display system delays executing the first procedure in the $(M+1)^{th}$ Vsync period, and starts to execute the second procedure and the device display procedure simultaneously at the start moment of the $(M+1)^{th}$ Vsync period. In this way, not only the time required for processing the three procedures in parallel in the $(M+1)^{th}$ Vsync period by the display system can be reduced, but also a time required for processing the first procedure and the second procedure in parallel in the $(M+1)^{th}$ Vsync period by the display system can be reduced, so that the CPU power consumption of the terminal device is further reduced.

Optionally, the display system may also delay executing the second procedure. Specifically, the method further includes:

obtaining, by the display system, third processing duration in which the display system executes a second procedure in the $M^{th}$ Vsync period, where the second procedure is the other one of the application drawing procedure and the surfaceflinger composition procedure different from the first procedure;

determining, by the display system, a start moment of the second procedure in the $(M+1)^{th}$ Vsync period according to the third processing duration, where the start moment of the second procedure in the $(M+1)^{th}$ Vsync period is after the start moment of the device display procedure, and a sum of the third processing duration and shift duration between the start moment of the second procedure and the start moment of the $(M+1)^{th}$ Vsync period is less than or equal to the duration of the $(M+1)^{th}$ Vsync period; and starting, by the display system, to execute the second procedure at the start moment of the second procedure in the $(M+1)^{th}$ Vsync period.

A process and principles of determining the start moment of the second procedure in the $(M+1)^{th}$ Vsync period by the display system are the same as those of determining the start moment of the first procedure in the $(M+1)^{th}$ Vsync period in step 502. Details are not described herein again.

When determining the start moment of the second procedure in the $(M+1)^{th}$ Vsync period, the display system also uses the third processing duration of the second procedure in the $M^{th}$ Vsync period as processing duration that is estimated by the display system and in which the display system executes the second procedure in the $(M+1)^{th}$ Vsync period.

By using the foregoing method, the display system also shifts the start moment of the second procedure in the $(M+1)^{th}$ Vsync period, so that execution of the second procedure is also delayed, time required for processing the three procedures in parallel in the $(M+1)^{th}$ Vsync period by the display system can also be reduced, and the CPU power consumption of the terminal device can also be reduced. In a diagram of a display example shown in FIG. 8, the first procedure is the surfaceflinger composition procedure, and the second procedure is the application drawing procedure. As shown in the figure, the display system shifts the start moment of the first procedure and the start moment of the second procedure, so that time required for processing the three procedures in parallel in the $(M+1)^{th}$ Vsync period by the display system is reduced, and the CPU power consumption of the terminal device is reduced.

Figure 8:
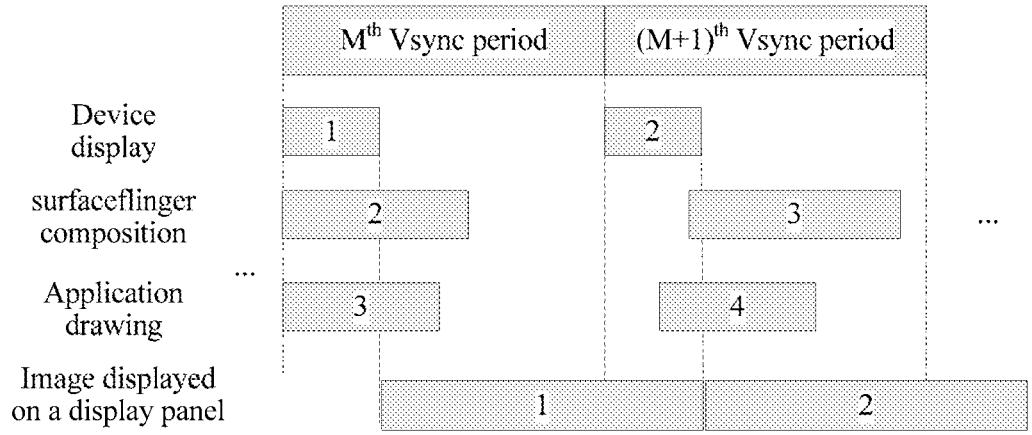
FIG. 8 is a flowchart of a display example according to an embodiment of the present invention.

Optionally, as shown in FIG. 8, the start moment of the first procedure in the $(M+1)^{th}$ Vsync period and the start moment of the second procedure in the $(M+1)^{th}$ Vsync period are different, where the start moment of the first procedure and the start moment of the second procedure are determined by the display system. In this way, not only the time required for processing the three procedures in parallel in the $(M+1)^{th}$ Vsync period by the display system can be reduced, but also a time required for processing the first procedure and the second procedure in parallel in the $(M+1)^{th}$ Vsync period by the display system can be reduced, so that the CPU power consumption of the terminal device is further reduced.

Optionally, the determining, by the display system, a start moment of the second procedure in the $(M+1)^{th}$ Vsync period according to the third processing duration includes:

obtaining, by the display system, the second processing duration in which the display system executes the device display procedure in the $M^{th}$ Vsync period; and determining, by the display system, the start moment of the second procedure in the $(M+1)^{th}$ Vsync period according to the second processing duration and the third processing duration, where the start moment of the second procedure is a second moment or is after the second moment, the second moment is a moment later than the start moment of the device display procedure by the second processing duration, and the sum of the third processing duration and the shift duration between the start moment of the second procedure and the start moment of the $(M+1)^{th}$ Vsync period is less than or equal to the duration of the $(M+1)^{th}$ Vsync period.

To avoid image display hysteresis, before setting that the start moment of the second procedure in the $(M+1)^{th}$ Vsync period is the second moment or is after the second moment, the display system needs to determine a relationship between the duration of the $(M+1)^{th}$ Vsync period and the sum of the third processing duration and the shift duration between the start moment of the second procedure and the start moment of the $(M+1)^{th}$ Vsync period. When determining that the sum of the third processing duration and the shift duration between the start moment of the second procedure and the start moment of the $(M+1)^{th}$ Vsync period is less than or equal to the duration of the $(M+1)^{th}$ Vsync period, the display system may set that the start moment of the second procedure in the $(M+1)^{th}$ Vsync period is the second moment or is after the second moment.

By using the foregoing method, the display system sets that the start moment of the second procedure in the $(M+1)^{th}$ Vsync period is the second moment or is after the second moment, that is, the display system starts to execute the second procedure when or after completing execution of the device display procedure in the $(M+1)^{th}$ Vsync period. In this way, it can be ensured that the display system executes the device display procedure and the second procedure in serial, and that the display system does not process the three procedures in parallel in one Vsync period, so that the CPU power consumption of the terminal device is further reduced.

Figure 9:
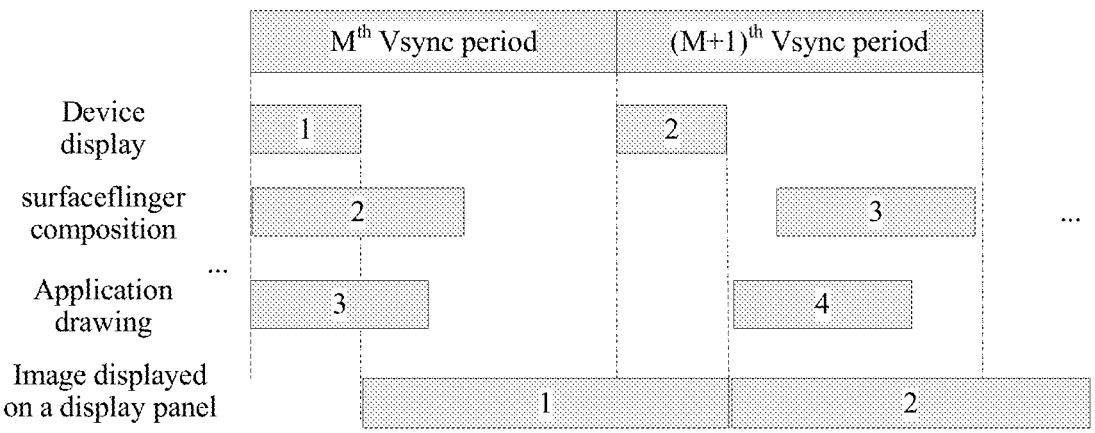
FIG. 9 is a flowchart of a display example according to an embodiment of the present invention.

In a diagram of a display example shown in FIG. 9, the first procedure is the surfaceflinger composition procedure, and the second procedure is the application drawing procedure. In the $(M+1)^{th}$ Vsync period, a moment at which the display system executes the application drawing procedure and a moment at which the display system executes the surfaceflinger composition procedure are after a moment at which the display system completes execution of the device display procedure. Therefore, the display system may process the first procedure and the second procedure in parallel in a time period after completing execution of the device display procedure in the current Vsync period. Compared with a conventional solution in which the display system executes the three procedures in parallel, the CPU power consumption of the terminal device is reduced.

To reduce a probability of image display hysteresis, optionally, the sum of the third processing duration and the shift duration between the start moment of the second procedure and the start moment of the $(M+1)^{th}$ Vsync period is less than or equal to a difference between the duration of the $(M+1)^{th}$ Vsync period and second preset duration, where the start moment of the second procedure is determined by the display system. In this way, even when the processing duration required for executing the second procedure in the $(M+1)^{th}$ Vsync period is greater than the third processing duration, provided that a duration difference obtained by subtracting the third processing duration from the processing duration required when the display system actually executes the second procedure in the $(M+1)^{th}$ Vsync period is less than the second preset duration, the display system may still complete execution of the second procedure before the $(M+1)^{th}$ Vsync period ends, so that a probability of image display hysteresis in the display system is reduced.

Optionally, the second preset duration and the foregoing first preset duration may be the same, or may be different. This embodiment of the present invention sets no limitation thereto.

Optionally, when the display system determines that a sum of the first processing duration, the second processing duration, and the third processing duration is less than or equal to the duration of the $(M+1)^{th}$ Vsync period, duration between the start moment of the first procedure and the start moment of the second procedure is greater than or equal to the first processing duration or the third processing duration.

Figure 10A:
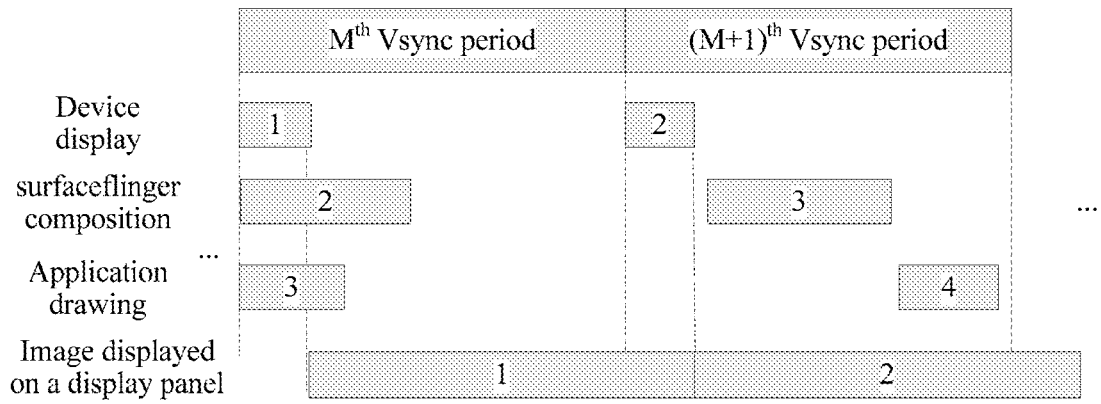
FIG. 10A is a flowchart of a display example according to an embodiment of the present invention.
Figure 10B:
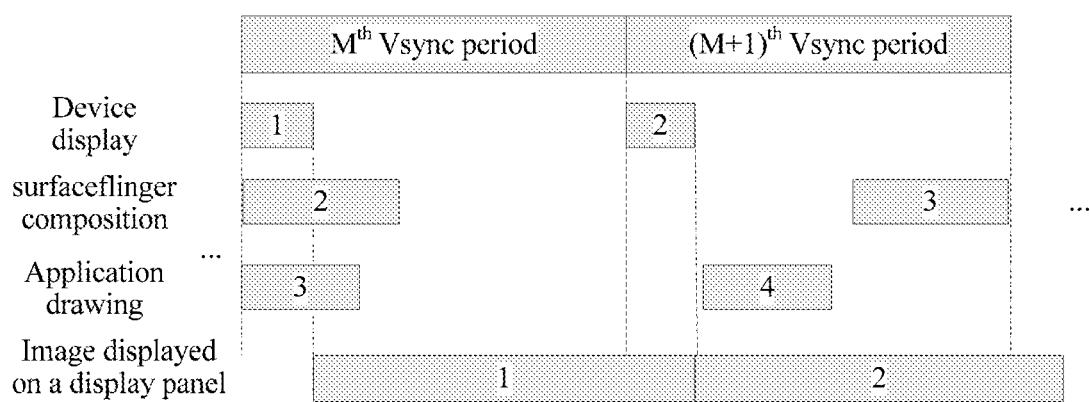
FIG. 10B is a flowchart of a display example according to an embodiment of the present invention.

When the duration between the start moment of the first procedure and the start moment of the second procedure is greater than or equal to the first processing duration, the display system successively executes the device display procedure, the first procedure, and the second procedure in the $(M+1)^{th}$ Vsync period. If the first procedure is the surfaceflinger composition procedure, and the second procedure is the application drawing procedure, a display procedure is shown in FIG. 10A. If the first procedure is the application drawing procedure, and the second procedure is the surfaceflinger composition procedure, a display procedure is shown in FIG. 10B.

When the duration between the start moment of the first procedure and the start moment of the second procedure is greater than or equal to the third processing duration, the display system successively executes the device display procedure, the second procedure, and the first procedure in the $(M+1)^{th}$ Vsync period. If the first procedure is the surfaceflinger composition procedure, and the second procedure is the application drawing procedure, a display procedure is shown in FIG. 10B. If the first procedure is the application drawing procedure, and the second procedure is the surfaceflinger composition procedure, a display procedure is shown in FIG. 10A.

By using the foregoing method, when determining that the sum of the first processing duration, the second processing duration, and the third processing duration is less than or equal to the duration of the $(M+1)^{th}$ Vsync period, the display system sets that the duration between the start moment of the first procedure in the $(M+1)^{th}$ Vsync period and the start moment of the second procedure in the $(M+1)^{th}$ Vsync period is greater than or equal to the first processing duration or the third processing duration. In this way, as shown in FIG. 10A and FIG. 10B, the display system executes the three procedures in serial in the $(M+1)^{th}$ Vsync period, so that the CPU power consumption of the terminal device is reduced to a largest extent.

Optionally, to avoid image hysteresis, the display system may set third preset duration. When determining that a sum of the first processing duration, the second processing duration, and the third processing duration is less than or equal to a difference between the duration of the $(M+1)^{th}$ Vsync period and the third preset duration, the display system further sets that the duration between the start moment of the first procedure in the $(M+1)^{th}$ Vsync period and the start moment of the second procedure in the $(M+1)^{th}$ Vsync period is greater than or equal to the first processing duration or the third processing duration.

Optionally, the display system may shift the start moment of the first procedure in each Vsync period, so as to reduce a time required for processing the three procedures in parallel in each Vsync period by the display system, and reduce the CPU power consumption of the terminal device in an entire display process. Similarly, further, the display system may also shift the start moment of the second procedure in each Vsync period, so as to reduce a time required for processing the three procedures in parallel in each Vsync period by the display system, and reduce the CPU power consumption of the terminal device in the entire display process. Still further, the display system sets that the start moment of the first procedure in each Vsync period and the start moment of the second procedure in each Vsync period are different moments, so as to reduce a time required for processing the first procedure and the second procedure in parallel in each Vsync period by the display system, and further reduce the CPU power consumption of the terminal device. Still further, if the display system sets that duration between the start moment of the first procedure in each Vsync period and the start moment of the second procedure in each Vsync period is greater than or equal to the first processing duration or the third processing duration, the display system may successively execute the three procedures in each Vsync period, so that the CPU power consumption of the terminal device in the entire display process can be reduced to a largest extent.

If the display system may shift the start moment of the first procedure in each Vsync period, a display delay or a frame loss may occur. Data that needs to be composited by the display system in the surfaceflinger composition procedure in a current Vsync period is a drawing result obtained in the application drawing procedure in a previous Vsync period, and data that needs to be displayed in the device display procedure is a composition result obtained in the surfaceflinger composition procedure in the previous Vsync period. When the display system shifts the start moment of the surfaceflinger composition procedure in each Vsync period, if composition in the surfaceflinger composition procedure is excessively slow in a Vsync period, the surfaceflinger composition procedure is not completed when the Vsync period ends, and the application drawing procedure is executed normally or faster, a composition result in the surfaceflinger composition procedure in the current period cannot be displayed in the device display procedure in a next Vsync period. Consequently, the display delay and the frame loss occur.

Figure 11:
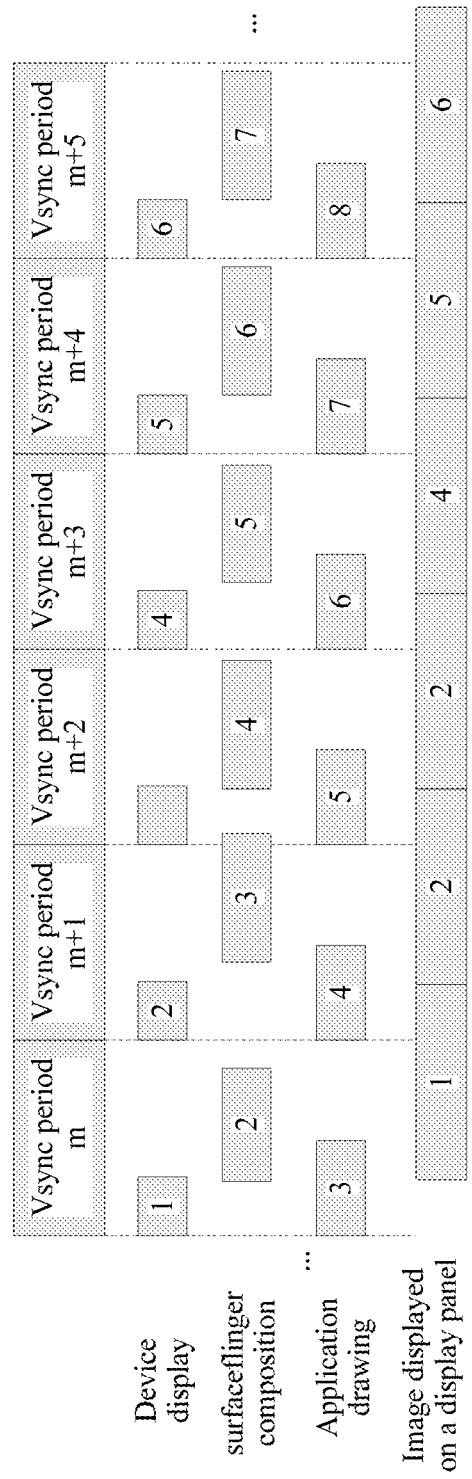
FIG. 11 is a schematic diagram of a display procedure in which a frame loss occurs according to an embodiment of the present invention.

For example, the frame loss occurs in a display procedure, shown in FIG. 11, of the display system.

The display system shifts the start moment of the surfaceflinger composition procedure in the $m^{th}$ Vsync period according to processing duration of the surfaceflinger procedure in a previous Vsync period. As shown in the figure, data of a first frame is processed in the device display procedure in the Vsync period, and the display panel displays the first frame of image when processing is completed. Data of a second frame is processed in the surfaceflinger composition procedure. Data of a third frame is processed in the application drawing procedure.

The display system still shifts the start moment of the surfaceflinger composition procedure in the $(m+1)^{th}$ Vsync period according to processing duration of the surfaceflinger procedure in the $m^{th}$ Vsync period. As shown in the figure, the data of the second frame is processed in the device display procedure in the Vsync period, and the display panel displays the second frame of image when processing is completed. The data of the third frame is processed in the surfaceflinger composition procedure. Data of a fourth frame is processed in the application drawing. Because the surfaceflinger composition procedure has a relatively long processing time period, processing of the surfaceflinger composition procedure is not completed when the $(m+1)^{th}$ Vsync period ends.

The display system continues to shift the start moment of the surfaceflinger composition procedure in an $(m+2)^{th}$ Vsync period according to processing duration of the surfaceflinger procedure in the $(m+1)^{th}$ Vsync period. As shown in the figure, the third frame cannot be displayed because the surfaceflinger composition procedure started in the $(m+1)^{th}$ Vsync period is not completed at the start moment of executing the device display procedure. Therefore, the display panel still displays the second frame of image. After execution of the surfaceflinger composition procedure started in the $(m+1)^{th}$ Vsync period is completed, the surfaceflinger composition procedure in the current Vsync period is started. The data of the fourth frame is processed in the surfaceflinger composition procedure. Data of a fifth frame is processed in the application drawing.

The display system continues to shift the start moment of the surfaceflinger composition procedure in an $(m+3)^{th}$ Vsync period according to processing duration of the surfaceflinger procedure in the $(m+2)^{th}$ Vsync period. As shown in the figure, the data of the fourth frame is processed in the device display procedure in the Vsync period, and the display panel displays the fourth frame of image when processing is completed. The data of the fifth frame is processed in the surfaceflinger composition procedure. Data of a sixth frame is processed in the application drawing.

As shown in the figure, according to description of the foregoing procedure, the display panel continuously displays the second frame of image in two Vsync periods, directly displays the fourth frame subsequently, and does not display the third frame. Consequently, the frame loss occurs.

Figure 12:
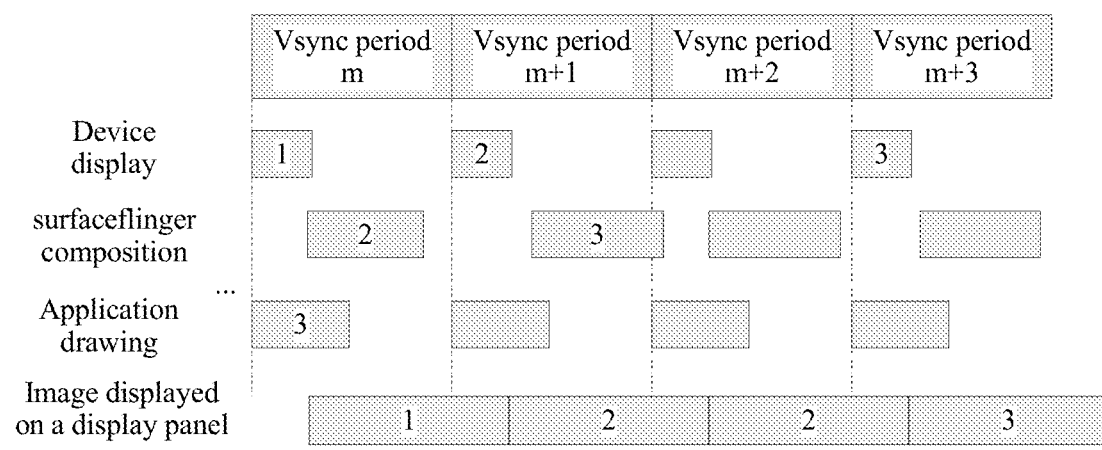
FIG. 12 is a schematic diagram of a display procedure in which a display delay occurs according to an embodiment of the present invention.

For another example, the display delay occurs in a display procedure, shown in FIG. 12, of the display system.

The display system shifts the start moment of the surfaceflinger composition procedure in the $m^{th}$ Vsync period according to processing duration of the surfaceflinger procedure in a previous Vsync period. As shown in the figure, data of a first frame is displayed in the device display procedure in the Vsync period, and the display panel displays the first frame of image when processing is completed. Data of a second frame is processed in the surfaceflinger composition procedure. Data of a third frame is processed in the application drawing procedure.

The display system still shifts the start moment of the surfaceflinger composition procedure in the $(m+1)^{th}$ Vsync period according to processing duration of the surfaceflinger procedure in the $m^{th}$ Vsync period. As shown in the figure, the data of the second frame is displayed in the device display procedure in the Vsync period, and the display panel displays the second frame of image when processing is completed. The data of the third frame is processed in the surfaceflinger composition procedure. No data is processed in application drawing processing because no image is updated subsequently. Because the surfaceflinger composition procedure has a relatively long processing time period, processing of the surfaceflinger composition procedure is not completed when the $(m+1)^{th}$ Vsync period ends.

The display system continues to shift the start moment of the surfaceflinger composition procedure in an $(m+2)^{th}$ Vsync period according to processing duration of the surfaceflinger procedure in the $(m+1)^{th}$ Vsync period. As shown in the figure, the third frame cannot be displayed because the surfaceflinger composition procedure started in the $(m+1)^{th}$ Vsync period is not completed at the start moment of executing the device display procedure. Therefore, the display panel still displays the second frame of image. After execution of the surfaceflinger composition procedure started in the $(m+1)^{th}$ Vsync period is completed, the surfaceflinger composition procedure in the current Vsync period is started. However, no data is processed in the surfaceflinger composition procedure in the current Vsync period either because no data is processed in the application drawing procedure in the $(m+1)^{th}$ Vsync period. No data is processed in the application drawing procedure in the current Vsync period either.

In an $(m+3)^{th}$ Vsync period, data generated in the surfaceflinger composition procedure in the $(m+1)^{th}$ Vsync period is not overwritten because execution of the surfaceflinger composition procedure in the $(m+1)^{th}$ Vsync period has been completed and no data is processed in the surfaceflinger composition procedure in the $(m+2)^{th}$ Vsync period. In the current Vsync period, the data of the third frame is processed in the device display procedure, and the display panel displays the third frame of image when processing is completed.

As shown in the figure, according to description of the foregoing procedure, the display panel displays the third frame of image after continuously displaying the second frame of image in two Vsync periods. Therefore, the display delay occurs in the third frame of image.

If the display system shifts the start moment of the surfaceflinger composition procedure in each Vsync period, a time period of executing the surfaceflinger composition procedure in a Vsync period may be longer than that of the surfaceflinger composition procedure in a previous Vsync period, and the probability of the display delay and the frame loss is relatively high. To avoid the foregoing display delay and frame loss as much as possible, after shifting the start moment of the surfaceflinger composition procedure in consecutive specified Vsync periods, the display system sets the start moment of the surfaceflinger composition procedure in a Vsync period following the specified Vsync periods as a start moment of the Vsync period, so that the start moment of the surfaceflinger composition procedure in the Vsync period is not shifted.

Similarly, after shifting the start moment of the application drawing procedure in consecutive specified Vsync periods, the display system sets the start moment of the application drawing procedure in a Vsync period following specified Vsync periods as a start moment of the Vsync period, so that the start moment of the surfaceflinger composition procedure in the Vsync period is not shifted.

Based on the above, the display system sets the start moment of the first procedure in an $(M+P)^{th}$ Vsync period as a start moment of the $(M+P)^{th}$ Vsync period, and P is a preset positive integer greater than 1.

The display system sets the start moment of the second procedure in an $(M+Q)^{th}$ Vsync period as a start moment of the $(M+Q)^{th}$ Vsync period, and Q is a preset positive integer greater than 1.

P and Q may be a same value, such as 10 or 20; or may be different values. The present invention sets no limitation thereto.

A CPU frequency of the terminal device may directly reflect CPU working performance and power consumption. Therefore, in this embodiment of the present invention, it is determined, by emulating the CPU frequency, whether the CPU power consumption and working performance can be reduced after a corresponding offset is set for at least one of the application drawing procedure or the surfaceflinger composition procedure in each Vsync period.

Figure 13:
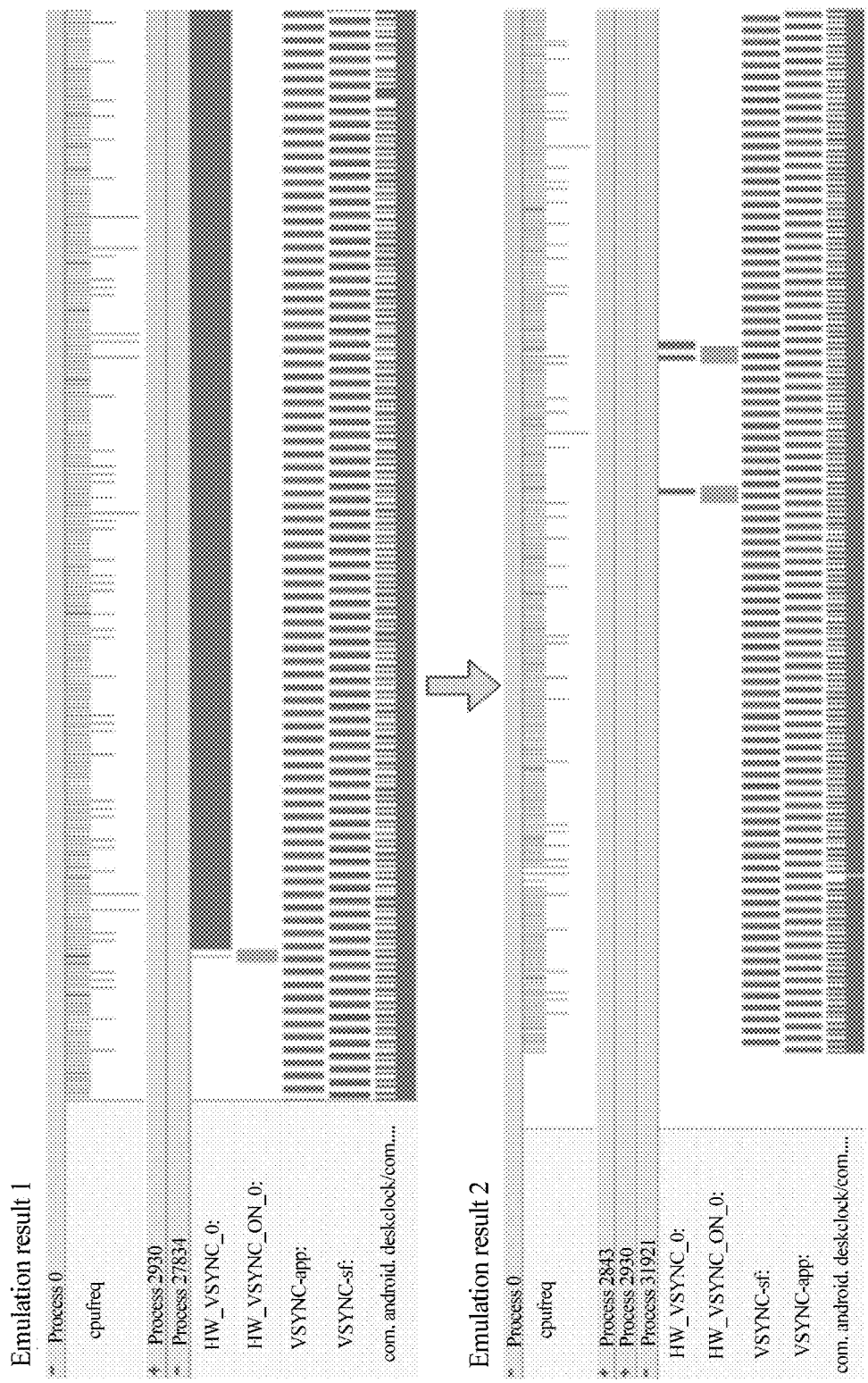
FIG. 13 is a diagram of CPU frequency emulation of a terminal device according to an embodiment of the present invention.

Referring to FIG. 13, when running a program Process0, the display system of the terminal device starts to process the application drawing procedure, the surfaceflinger composition procedure, and the device display procedure in parallel at the start moment of each Vsync period by using the conventional Vsync technology. In this case, in a process in which the display system runs the program Process0, the CPU frequency at each moment is shown in cpufreq in an emulation result 1 on the left of the figure.

When running a same program Process0 but shifting the start moment of the surfaceflinger composition procedure in each Vsync period, the display system of the terminal device delays executing the procedure, but starts to execute the other two procedures at the start moment of each Vsync period. In this case, in a process in which the display system runs the program Process0, the CPU frequency at each moment is shown in cpufreq in an emulation result 2 on the right of the figure.

Statistics about CPU load of the terminal device are collected according to the foregoing two emulation results, and are shown in Table 1:

TABLE 1

| Statistics about the CPU load of the terminal device | | | |
|---|---|---|---|
| System load | Low-frequency quantity | Intermediate-frequency quantity | High-frequency quantity |
| Emulation result 1 | Several | 43 | 8 |
| Emulation result 2 | Several | 42 | 2 |

It can be learned from Table 1 that when display content of the terminal device is not changed (a frame rate of the display content is not changed), a high-frequency quantity in the emulation result 2 is obviously less than a high-frequency quantity in the emulation result 1. Obviously, if the display system of the terminal device shifts the start moment of the surfaceflinger composition procedure in each Vsync period, to delay executing the procedure, the CPU frequency of the terminal device can be obviously reduced, and system load is reduced, that is, the CPU power consumption and working performance are reduced, so that a significant effect is obtained.

Based on the above, by using the display method provided in this embodiment of the present invention, after obtaining the first processing duration of executing the first procedure in the $M^{th}$ Vsync period, the display system of the terminal device determines the start moment of the first procedure in a next Vsync period (the $(M+1)^{th}$ Vsync period) according to the first processing duration. The first procedure is the application drawing procedure or the surfaceflinger composition procedure. The start moment of the first procedure in the $(M+1)^{th}$ Vsync period is after the start moment of the device display procedure, and the sum of the first processing duration and the shift duration between the start moment of the first procedure and the start moment of the $(M+1)^{th}$ Vsync period is less than or equal to the duration of the $(M+1)^{th}$ Vsync period. In the $(M+1)^{th}$ Vsync period, the display system starts to execute the device display procedure at the start moment of the device display procedure, and starts to execute the first procedure at the start moment of the first procedure. In this way, in the $(M+1)^{th}$ Vsync period, the display system delays executing either the application drawing procedure or the surfaceflinger composition procedure, so that a time required for processing the three procedures in parallel in the $(M+1)^{th}$ Vsync period by the display system of the terminal device is reduced, and the CPU power consumption of the terminal device is reduced.

Figure 14:
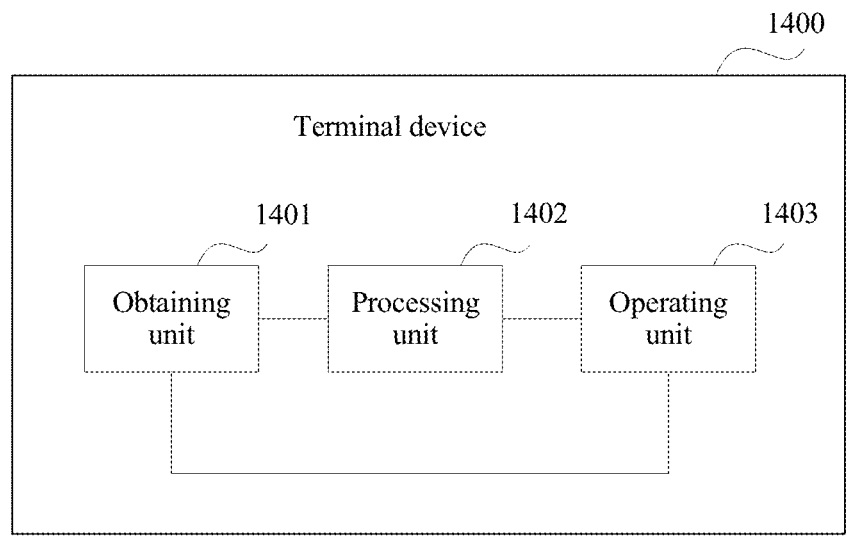
FIG. 14 is a schematic structural diagram of a terminal device according to an embodiment of the present invention.

Based on the foregoing embodiment, an embodiment of the present invention further provides a terminal device. The terminal device is configured to execute a device display procedure, an application drawing procedure, and a surfaceflinger composition procedure in one Vsync period. Referring to FIG. 14, the terminal device 1400 includes: an obtaining unit 1401, a processing unit 1402, and an operating unit 1403.

The obtaining unit 1401 is configured to obtain first processing duration in which the operating unit 1403 executes a first procedure in an $M^{th}$ Vsync period. The first procedure is the application drawing procedure or the surfaceflinger composition procedure, and M is a positive integer greater than or equal to 1.

The processing unit 1402 is configured to determine a start moment of the first procedure in an $(M+1)^{th}$ Vsync period according to the first processing duration. The start moment of the first procedure in the $(M+1)^{th}$ Vsync period is after a start moment of the device display procedure, and a sum of the first processing duration and shift duration between the start moment of the first procedure and a start moment of the $(M+1)^{th}$ Vsync period is less than or equal to duration of the $(M+1)^{th}$ Vsync period.

The operating unit 1403 is configured to: in the $(M+1)^{th}$ Vsync period, start to execute the display procedure at the start moment of the device display procedure, and start to execute the first procedure at the start moment of the first procedure.

Optionally, the start moment of the device display procedure in the $(M+1)^{th}$ Vsync period is the start moment of the $(M+1)^{th}$ Vsync period.

Optionally, the obtaining unit 1401 is further configured to obtain second processing duration in which the operating unit 1403 executes the device display procedure in the $M^{th}$ Vsync period.

The processing unit 1402 is specifically configured to determine the start moment of the first procedure in the $(M+1)^{th}$ Vsync period according to the first processing duration and the second processing duration. The start moment of the first procedure is a first moment or is after the first moment. The first moment is a moment later than the start moment of the device display procedure by the second processing duration, and the sum of the first processing duration and the shift duration between the start moment of the first procedure and the start moment of the $(M+1)^{th}$ Vsync period is less than or equal to the duration of the $(M+1)^{th}$ Vsync period.

Optionally, the obtaining unit 1401 is further configured to obtain third processing duration in which the operating unit 1403 executes a second procedure in the $M^{th}$ Vsync period. The second procedure is the other one of the application drawing procedure and the surfaceflinger composition procedure different from the first procedure.

The processing unit 1402 is further configured to determine a start moment of the second procedure in the $(M+1)^{th}$ Vsync period according to the third processing duration. The start moment of the second procedure in the $(M+1)^{th}$ Vsync period is after the start moment of the device display procedure, and a sum of the third processing duration and shift duration between the start moment of the second procedure and the start moment of the $(M+1)^{th}$ Vsync period is less than or equal to the duration of the $(M+1)^{th}$ Vsync period.

The operating unit 1403 is further configured to start to execute the second procedure at the start moment of the second procedure in the $(M+1)^{th}$ Vsync period.

Optionally, the obtaining unit 1401 is further configured to obtain second processing duration in which the operating unit 1403 executes the device display procedure in the $M^{th}$ Vsync period.

The processing unit 1402 is specifically configured to determine the start moment of the second procedure in the $(M+1)^{th}$ Vsync period according to the second processing duration and the third processing duration. The start moment of the second procedure is a second moment or is after the second moment. The second moment is a moment later than the start moment of the device display procedure by the second processing duration, and the sum of the third processing duration and the shift duration between the start moment of the second procedure and the start moment of the $(M+1)^{th}$ Vsync period is less than or equal to the duration of the $(M+1)^{th}$ Vsync period.

Optionally, the processing unit 1402 is further configured to:

when it is determined that a sum of the first processing duration, the second processing duration, and the third processing duration is less than or equal to the duration of the $(M+1)^{th}$ Vsync period, set that the start moment of the first procedure in the $(M+1)^{th}$ Vsync period and the start moment of the second procedure in the $(M+1)^{th}$ Vsync period meet the following condition:

duration between the start moment of the first procedure and the start moment of the second procedure is greater than or equal to the first processing duration or the third processing duration.

Optionally, the sum of the first processing duration and the shift duration between the start moment of the first procedure and the start moment of the $(M+1)^{th}$ Vsync period is less than or equal to a difference between the duration of the $(M+1)^{th}$ Vsync period and first preset duration.

Optionally, the sum of the third processing duration and the shift duration between the start moment of the second procedure and the start moment of the $(M+1)^{th}$ Vsync period is less than or equal to a difference between the duration of the $(M+1)^{th}$ Vsync period and second preset duration.

Optionally, the processing unit 1402 is further configured to:

set the start moment of the first procedure in an $(M+P)^{th}$ Vsync period as a start moment of the $(M+P)^{th}$ Vsync period, where P is a preset positive integer greater than 1.

Optionally, the processing unit 1402 is further configured to:

set the start moment of the second procedure in an $(M+Q)^{th}$ Vsync period as a start moment of the $(M+Q)^{th}$ Vsync period, where Q is a preset positive integer greater than 1.

According to the terminal device provided in this embodiment of the present invention, after obtaining the first processing duration of executing the first procedure in the $M^{th}$ Vsync period, the terminal device determines the start moment of the first procedure in the $(M+1)^{th}$ Vsync period according to the first processing duration. The first procedure is the application drawing procedure or the surfaceflinger composition procedure. The start moment of the first procedure in the $(M+1)^{th}$ Vsync period is after the start moment of the device display procedure, and the sum of the first processing duration and the shift duration between the start moment of the first procedure and the start moment of the $(M+1)^{th}$ Vsync period is less than or equal to the duration of the $(M+1)^{th}$ Vsync period. In the $(M+1)^{th}$ Vsync period, the terminal device starts to execute the device display procedure at the start moment of the device display procedure, and starts to execute the first procedure at the start moment of the first procedure. In this way, in the $(M+1)^{th}$ Vsync period, a display system delays executing either the application drawing procedure or the surfaceflinger composition procedure, so that a time required for processing the three procedures in parallel in the $(M+1)^{th}$ Vsync period by the terminal device is reduced, and CPU power consumption of the terminal device is reduced.

It should be noted that unit division in this embodiment of the present invention is only an example, and is only logical function division and may be other division during actual implementation. Functional units in this embodiment of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or all or some of the technical solutions may be implemented in a form of a software product. The computer software product is stored in a storage medium, and includes several instructions for instructing a terminal device (which may be a personal computer, a mobile phone, a network device, or the like) or a processor (processor) to perform all or some of the steps of the methods described in the embodiments of this application. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or an optical disc.

Figure 15:
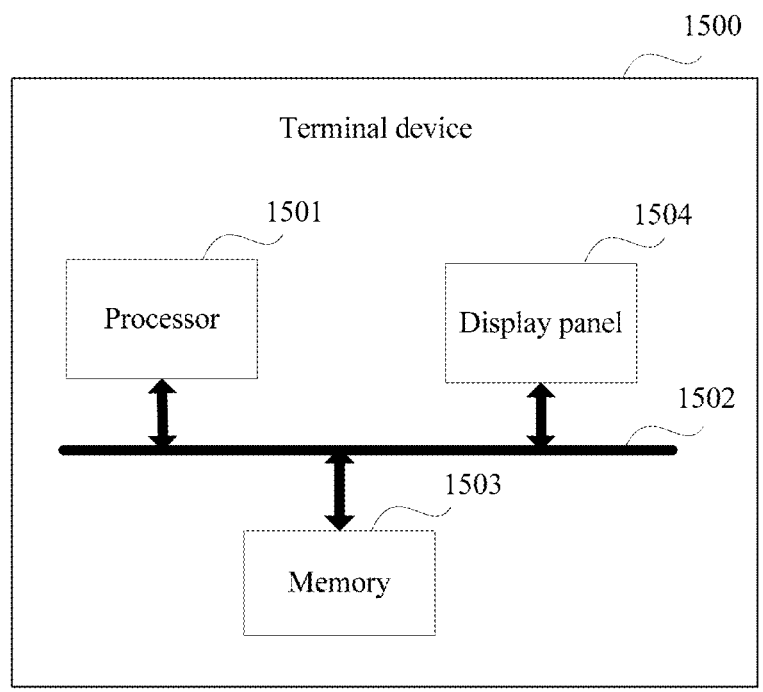
FIG. 15 is a schematic structural diagram of a terminal device according to an embodiment of the present invention.

Based on the foregoing embodiment, an embodiment of the present invention further provides a terminal device. The terminal device is configured to execute a device display procedure, an application drawing procedure, and a surface surfaceflinger composition procedure in one vertical synchronization Vsync period. Referring to FIG. 15, the terminal device 1500 includes: a processor 1501, a bus 1502, a memory 1503, and a display panel 1504.

The processor 1501, the memory 1503, and the display panel 1504 are connected by using the bus 1502. The bus 1502 may be a peripheral component interconnect (peripheral component interconnect, PCI for short) bus, an extended industry standard architecture (extended industry standard architecture, EISA for short) bus, or the like. The bus may be classified into an address bus, a data bus, a control bus, and the like. For ease of denotation, the bus is represented by using only one thick line in FIG. 15; however, it does not indicate that there is only one bus or only one type of bus.

The processor 1501 is configured to implement the display method shown in FIG. 5, and the method includes the following steps:

obtaining first processing duration in which the processor 1501 executes a first procedure in an $M^{th}$ Vsync period, where the first procedure is the application drawing procedure or the surfaceflinger composition procedure, and M is a positive integer greater than or equal to 1;

determining a start moment of the first procedure in an $(M+1)^{th}$ Vsync period according to the first processing duration, where the start moment of the first procedure in the $(M+1)^{th}$ Vsync period is after a start moment of the device display procedure, and a sum of the first processing duration and shift duration between the start moment of the first procedure and a start moment of the $(M+1)^{th}$ Vsync period is less than or equal to duration of the $(M+1)^{th}$ Vsync period; and in the $(M+1)^{th}$ Vsync period, starting to execute the display procedure at the start moment of the device display procedure, and starting to execute the first procedure at the start moment of the first procedure.

Optionally, the start moment of the device display procedure in the $(M+1)^{th}$ Vsync period is the start moment of the $(M+1)^{th}$ Vsync period.

Optionally, the determining, by the processor 1501, a start moment of the first procedure in the $(M+1)^{th}$ Vsync period according to the first processing duration includes:

obtaining second processing duration in which the processor 1501 executes the device display procedure in the $M^{th}$ Vsync period; and determining the start moment of the first procedure in the $(M+1)^{th}$ Vsync period according to the first processing duration and the second processing duration, where the start moment of the first procedure is a first moment or is after the first moment, the first moment is a moment later than the start moment of the device display procedure by the second processing duration, and the sum of the first processing duration and the shift duration between the start moment of the first procedure and the start moment of the $(M+1)^{th}$ Vsync period is less than or equal to the duration of the $(M+1)^{th}$ Vsync period.

Optionally, the processor 1501 is further configured to:

obtain third processing duration in which the processor 1501 executes a second procedure in the $M^{th}$ Vsync period, where the second procedure is the other one of the application drawing procedure and the surfaceflinger composition procedure different from the first procedure;

determine a start moment of the second procedure in the $(M+1)^{th}$ Vsync period according to the third processing duration, where the start moment of the second procedure in the $(M+1)^{th}$ Vsync period is after the start moment of the device display procedure, and a sum of the third processing duration and shift duration between the start moment of the second procedure and the start moment of the $(M+1)^{th}$ Vsync period is less than or equal to the duration of the $(M+1)^{th}$ Vsync period; and start to execute the second procedure at the start moment of the second procedure in the $(M+1)^{th}$ Vsync period.

Optionally, the determining a start moment of the second procedure in the $(M+1)^{th}$ Vsync period according to the third processing duration includes:

obtaining the second processing duration in which the processor 1501 executes the device display procedure in the $M^{th}$ Vsync period; and determining the start moment of the second procedure in the $(M+1)^{th}$ Vsync period according to the second processing duration and the third processing duration, where the start moment of the second procedure is a second moment or is after the second moment, the first moment is a moment later than the start moment of the device display procedure by the second processing duration, and the sum of the third processing duration and the shift duration between the start moment of the second procedure and the start moment of the $(M+1)^{th}$ Vsync period is less than or equal to the duration of the $(M+1)^{th}$ Vsync period.

Optionally, when the processor 1501 determines that a sum of the first processing duration, the second processing duration, and the third processing duration is less than or equal to the duration of the $(M+1)^{th}$ Vsync period, duration between the start moment of the first procedure and the start moment of the second procedure is greater than or equal to the first processing duration or the third processing duration.

Optionally, the sum of the first processing duration and the shift duration between the start moment of the first procedure and the start moment of the $(M+1)^{th}$ Vsync period is less than or equal to a difference between the duration of the $(M+1)^{th}$ Vsync period and first preset duration.

Optionally, the sum of the third processing duration and the shift duration between the start moment of the second procedure and the start moment of the $(M+1)^{th}$ Vsync period is less than or equal to a difference between the duration of the $(M+1)^{th}$ Vsync period and second preset duration.

Optionally, the processor 1501 is further configured to:

set the start moment of the first procedure in an $(M+P)^{th}$ Vsync period as a start moment of the $(M+P)^{th}$ Vsync period, where P is a preset positive integer greater than 1.

Optionally, the processor 1501 is further configured to:

set the start moment of the second procedure in an $(M+Q)^{th}$ Vsync period as a start moment of the $(M+Q)^{th}$ Vsync period, where Q is a preset positive integer greater than 1.

The display panel 1504 is configured to: after the processor executes the device display procedure in each Vsync period, display an image generated after the processor executes the device display procedure. The display panel 1504 may be configured in a form of an LCD, an OLED, or the like.

Based on the above, according to the display method and the terminal device provided in the embodiments of the present invention, after obtaining the first processing duration of executing the first procedure in the $M^{th}$ Vsync period, the display system of the terminal device determines the start moment of the first procedure in the $(M+1)^{th}$ Vsync period according to the first processing duration. The first procedure is the application drawing procedure or the surfaceflinger composition procedure. The start moment of the first procedure in the $(M+1)^{th}$ Vsync period is after the start moment of the device display procedure, and the sum of the first processing duration and the shift duration between the start moment of the first procedure and the start moment of the $(M+1)^{th}$ Vsync period is less than or equal to the duration of the $(M+1)^{th}$ Vsync period. In the $(M+1)^{th}$ Vsync period, the display system starts to execute the device display procedure at the start moment of the device display procedure, and starts to execute the first procedure at the start moment of the first procedure. In this way, in the $(M+1)^{th}$ Vsync period, the display system delays executing either the application drawing procedure or the surfaceflinger composition procedure, so that a time required for processing the three procedures in parallel in the $(M+1)^{th}$ Vsync period by the display system of the terminal device is reduced, and the CPU power consumption of the terminal device is reduced.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Apparently, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A display method, wherein the method is applied to a display system of a terminal device, the display system is used to execute a device display procedure, an application drawing procedure, and a surfaceflinger composition procedure in one vertical synchronization (Vsync) period, and the method comprises:
   obtaining, by the display system, a first processing duration in which the display system executes a first procedure in an $M^{th}$ Vsync period, wherein the first procedure is the application drawing procedure or the surfaceflinger composition procedure, and wherein M is a positive integer greater than or equal to 1;
   determining, by the display system, a start moment of the first procedure in an $(M+1)^{th}$ Vsync period according to the first processing duration, wherein the start moment of the first procedure in the $(M+1)^{th}$ Vsync period is after a start moment of the device display procedure, and wherein a sum of the first processing duration and shift duration between the start moment of the first procedure and a start moment of the $(M+1)^{th}$ Vsync period is less than or equal to duration of the $(M+1)^{th}$ Vsync period; and
   in the $(M+1)^{th}$ Vsync period:
      starting, by the display system, to execute the device display procedure at the start moment of the device display procedure; and
      starting, by the display system, to execute the first procedure at the start moment of the first procedure.

2. The method according to claim 1, wherein the start moment of the device display procedure in the $(M+1)^{th}$ Vsync period is the start moment of the $(M+1)^{th}$ Vsync period.

3. The method according to claim 1, wherein the determining, by the display system, a start moment of the first procedure in the $(M+1)^{th}$ Vsync period according to the first processing duration comprises:
   obtaining, by the display system, a second processing duration in which the display system executes the device display procedure in the $M^{th}$ Vsync period; and
   determining, by the display system, the start moment of the first procedure in the $(M+1)^{th}$ Vsync period according to the first processing duration and the second processing duration, wherein the start moment of the first procedure is a first moment or is after the first moment, wherein the first moment is a moment later than the start moment of the device display procedure by the second processing duration, and wherein the sum of the first processing duration and the shift duration between the start moment of the first procedure and the start moment of the $(M+1)^{th}$ Vsync period is less than or equal to the duration of the $(M+1)^{th}$ Vsync period.

4. The method according to claim 1, wherein the method further comprises:
   obtaining, by the display system, a third processing duration in which the display system executes a second procedure in the $M^{th}$ Vsync period, wherein the second procedure is the other one of the application drawing procedure and the surfaceflinger composition procedure different from the first procedure;
   determining, by the display system, a start moment of the second procedure in the $(M+1)^{th}$ Vsync period according to the third processing duration, wherein the start moment of the second procedure in the $(M+1)^{th}$ Vsync period is after the start moment of the device display procedure, and wherein a sum of the third processing duration and shift duration between the start moment of the second procedure and the start moment of the $(M+1)^{th}$ Vsync period is less than or equal to the duration of the $(M+1)^{th}$ Vsync period; and
   starting, by the display system, to execute the second procedure at the start moment of the second procedure in the $(M+1)^{th}$ Vsync period.

5. The method according to claim 4, wherein the determining, by the display system, a start moment of the second procedure in the $(M+1)^{th}$ Vsync period according to the third processing duration comprises:
   obtaining, by the display system, a second processing duration in which the display system executes the device display procedure in the $M^{th}$ Vsync period; and
   determining, by the display system, the start moment of the second procedure in the $(M+1)^{th}$ Vsync period according to the second processing duration and the third processing duration, wherein the start moment of the second procedure is a second moment or is after the second moment, wherein the second moment is a moment later than the start moment of the device display procedure by the second processing duration, and wherein the sum of the third processing duration and the shift duration between the start moment of the second procedure and the start moment of the $(M+1)^{th}$ Vsync period is less than or equal to the duration of the $(M+1)^{th}$ Vsync period.

6. The method according to claim 4, wherein when the display system determines that a sum of the first processing duration, the second processing duration, and the third processing duration is less than or equal to the duration of the $(M+1)^{th}$ Vsync period, duration between the start moment of the first procedure and the start moment of the second procedure is greater than or equal to the first processing duration or the third processing duration.

7. The method according to claim 1, wherein the sum of the first processing duration and the shift duration between the start moment of the first procedure and the start moment of the $(M+1)^{th}$ Vsync period is less than or equal to a difference between the duration of the $(M+1)^{th}$ Vsync period and first preset duration.

8. The method according to claim 4, wherein the sum of the third processing duration and the shift duration between the start moment of the second procedure and the start moment of the $(M+1)^{th}$ Vsync period is less than or equal to a difference between the duration of the $(M+1)^{th}$ Vsync period and second preset duration.

9. The method according to claim 1, wherein the method further comprises:
setting, by the display system, the start moment of the first procedure in an $(M+P)^{th}$ Vsync period as a start moment of the $(M+P)^{th}$ Vsync period, wherein P is a preset positive integer greater than 1.

10. The method according to claim 4, wherein the method further comprises:
setting, by the display system, the start moment of the second procedure in an $(M+Q)^{th}$ Vsync period as a start moment of the $(M+Q)^{th}$ Vsync period, wherein Q is a preset positive integer greater than 1.

11. A terminal device, wherein the terminal device is configured to execute a device display procedure, an application drawing procedure, and a surfaceflinger composition procedure in one vertical synchronization Vsync period, and the terminal device comprises:
a non-transitory memory storage comprising instructions;
one or more hardware processors in communication with the memory storage, wherein the one or more hardware processors execute the instructions to:
obtain a first processing duration in which an operating unit executes a first procedure in an $M^{th}$ Vsync period, wherein the first procedure is the application drawing procedure or the surfaceflinger composition procedure, and M is a positive integer greater than or equal to 1;
determine a start moment of the first procedure in an $(M+1)^{th}$ Vsync period according to the first processing duration, wherein the start moment of the first procedure in the $(M+1)^{th}$ Vsync period is after a start moment of the device display procedure, and a sum of the first processing duration and shift duration between the start moment of the first procedure and a start moment of the $(M+1)^{th}$ Vsync period is less than or equal to duration of the $(M+1)^{th}$ Vsync period; and
in the $(M+1)^{th}$ Vsync period:
start to execute the device display procedure at the start moment of the device display procedure; and
start to execute the first procedure at the start moment of the first procedure.

12. The terminal device according to claim 11, wherein the start moment of the device display procedure in the $(M+1)^{th}$ Vsync period is the start moment of the $(M+1)^{th}$ Vsync period.

13. The terminal device according to claim 11, wherein the one or more hardware processors execute the instructions to:
obtain a second processing duration in which the operating unit executes the device display procedure in the $M^{th}$ Vsync period; and
determine the start moment of the first procedure in the $(M+1)^{th}$ Vsync period according to the first processing duration and the second processing duration, wherein the start moment of the first procedure is a first moment or is after the first moment, the first moment is a moment later than the start moment of the device display procedure by the second processing duration, and wherein the sum of the first processing duration and the shift duration between the start moment of the first procedure and the start moment of the $(M+1)^{th}$ Vsync period is less than or equal to the duration of the $(M+1)^{th}$ Vsync period.

14. The terminal device according to claim 11, wherein the one or more hardware processors execute the instructions to:
obtain a third processing duration in which the operating unit executes a second procedure in the $M^{th}$ Vsync period, wherein the second procedure is the other one of the application drawing procedure and the surfaceflinger composition procedure different from the first procedure;
determine a start moment of the second procedure in the $(M+1)^{th}$ Vsync period according to the third processing duration, wherein the start moment of the second procedure in the $(M+1)^{th}$ Vsync period is after the start moment of the device display procedure, and wherein a sum of the third processing duration and shift duration between the start moment of the second procedure and the start moment of the $(M+1)^{th}$ Vsync period is less than or equal to the duration of the $(M+1)^{th}$ Vsync period; and
start to execute the second procedure at the start moment of the second procedure in the $(M+1)^{th}$ Vsync period.

15. The terminal device according to claim 14, wherein the one or more hardware processors execute the instructions to:
obtain a second processing duration in which the operating unit executes the device display procedure in the $M^{th}$ Vsync period; and
determine the start moment of the second procedure in the $(M+1)^{th}$ Vsync period according to the second processing duration and the third processing duration, wherein the start moment of the second procedure is a second moment or is after the second moment, wherein the second moment is a moment later than the start moment of the device display procedure by the second processing duration, and wherein the sum of the third processing duration and the shift duration between the start moment of the second procedure and the start moment of the $(M+1)^{th}$ Vsync period is less than or equal to the duration of the $(M+1)^{th}$ Vsync period.

16. The terminal device claim 14, wherein the one or more hardware processors execute the instructions to:
when a sum of the first processing duration, the second processing duration, and the third processing duration is less than or equal to the duration of the $(M+1)^{th}$ Vsync period, set that the start moment of the first procedure in the $(M+1)^{th}$ Vsync period and the start moment of the second procedure in the $(M+1)^{th}$ Vsync period meet the following condition:
duration between the start moment of the first procedure and the start moment of the second procedure is greater than or equal to the first processing duration or the third processing duration.

17. The terminal device according to claim 11, wherein the sum of the first processing duration and the shift duration between the start moment of the first procedure and the start moment of the $(M+1)^{th}$ Vsync period is less than or equal to a difference between the duration of the $(M+1)^{th}$ Vsync period and first preset duration.

18. The terminal device according to claim 14, wherein the sum of the third processing duration and the shift duration between the start moment of the second procedure and the start moment of the $(M+1)^{th}$ Vsync period is less than or equal to a difference between the duration of the $(M+1)^{th}$ Vsync period and second preset duration.

19. The terminal device according to claim 11, wherein the one or more hardware processors execute the instructions to:
    set the start moment of the first procedure in an $(M+P)^{th}$ Vsync period as a start moment of the $(M+P)^{th}$ Vsync period, wherein P is a preset positive integer greater than 1.

20. The terminal device according to claim 14, wherein the one or more hardware processors execute the instructions to:
    set the start moment of the second procedure in an $(M+Q)^{th}$ Vsync period as a start moment of the $(M+Q)^{th}$ Vsync period, wherein Q is a preset positive integer greater than 1.

* * * * *

UNITED STATES PATENT AND TRADEMARK OFFICE
CERTIFICATE OF CORRECTION

PATENT NO. : 10,614,772 B2  
APPLICATION NO. : 16/083027  
DATED : April 7, 2020  
INVENTOR(S) : Jing Zhao and Bo Yu Page 1 of 1

It is certified that error appears in the above-identified patent and that said Letters Patent is hereby corrected as shown below:

In the Claims

In Column 32, Line 52, in Claim 16, after "device" insert -- according to --, therefor.

Signed and Sealed this  
Fourteenth Day of July, 2020

Andrei Iancu  
*Director of the United States Patent and Trademark Office*